United States Patent [19]

Peterson et al.

[11] 4,158,433

[45] Jun. 19, 1979

[54] METHOD OF AND APPARATUS FOR SECURING AND STORING PERSONAL INFORMATION

[76] Inventors: Glen Peterson, 540 S. 83rd E. Ave., Tulsa, Okla. 74112; Robert E. Fearon, 5246 S. 76 E. Ave., Tulsa, Okla. 74145

[21] Appl. No.: 744,142

[22] Filed: Nov. 22, 1976

[51] Int. Cl.² .................... G06K 5/00; G06K 7/08; G06K 19/06; G11C 7/00
[52] U.S. Cl. .................... 235/380; 235/419; 235/449; 235/493; 365/97; 365/189
[58] Field of Search .................... 235/61.11 D, 61.7 B, 235/380, 449, 419; 340/174 YA, 174 M, 149 A; 365/67, 69, 97, 189

[56] References Cited

U.S. PATENT DOCUMENTS

| 3,182,296 | 5/1965 | Baldwin, Jr. et al. | 340/174 YA |
| 3,436,749 | 4/1969 | Matick et al. | 340/174 YA |
| 3,460,111 | 8/1969 | Matick | 340/174 YA |
| 4,055,746 | 10/1977 | Peterson | 235/61.7 B |

*Primary Examiner*—Daryl W. Cook
*Attorney, Agent, or Firm*—Head, Johnson & Chafin

[57] ABSTRACT

Secured computerized credit cards of the ferromagnetic storage variety, and a computer system that makes use of such cards at more than one location. The card comprises a plurality of ferromagnetic elements, within a continuous ferromagnetic medium, capable of storing binary indicia, sandwiched between thin sheets of plastic or other non-magnetic material. The magnetic elements are tangentially polarized, and locked-in by virtue of two contiguous sheets having different coercivities. Security is provided by programming the information stored on the card in a variety of ways under the exclusive control of the card owner.

18 Claims, 40 Drawing Figures

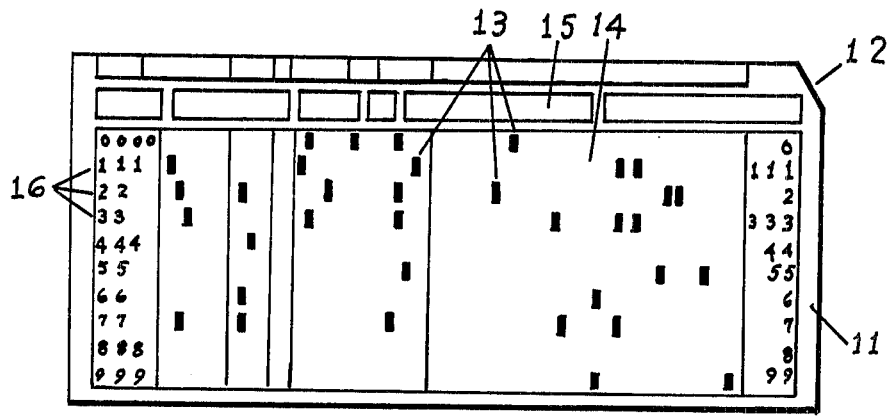
FIG. 1
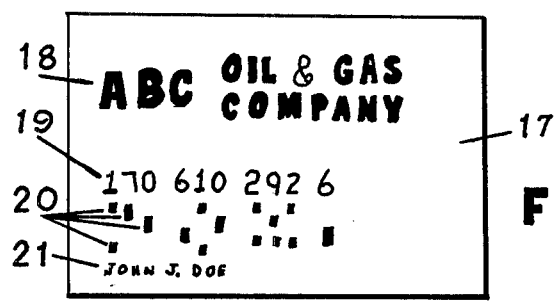
FIG. 2
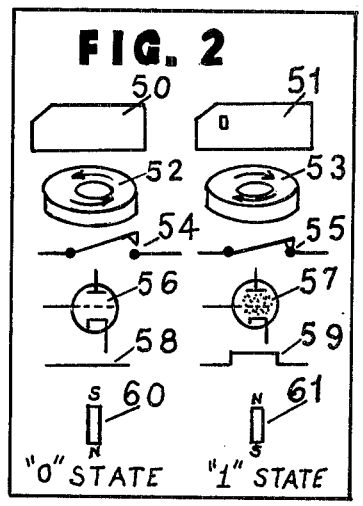
FIG. 3
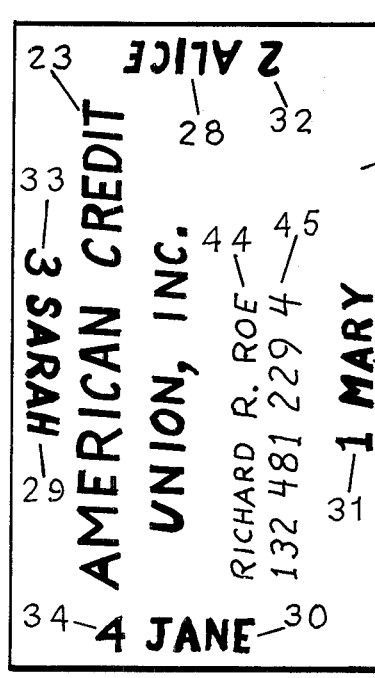
FIG. 4
FIG. 5
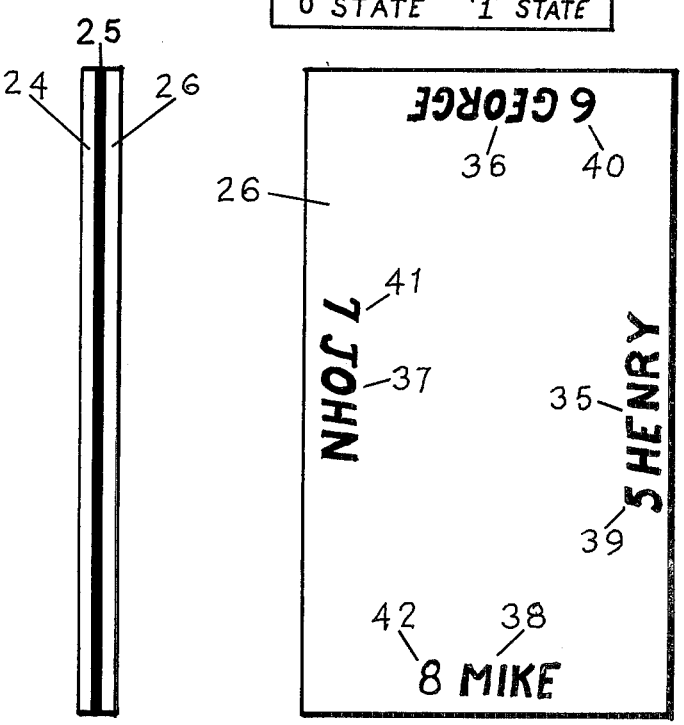
FIG. 6

FIG. 11     FIG. 11a

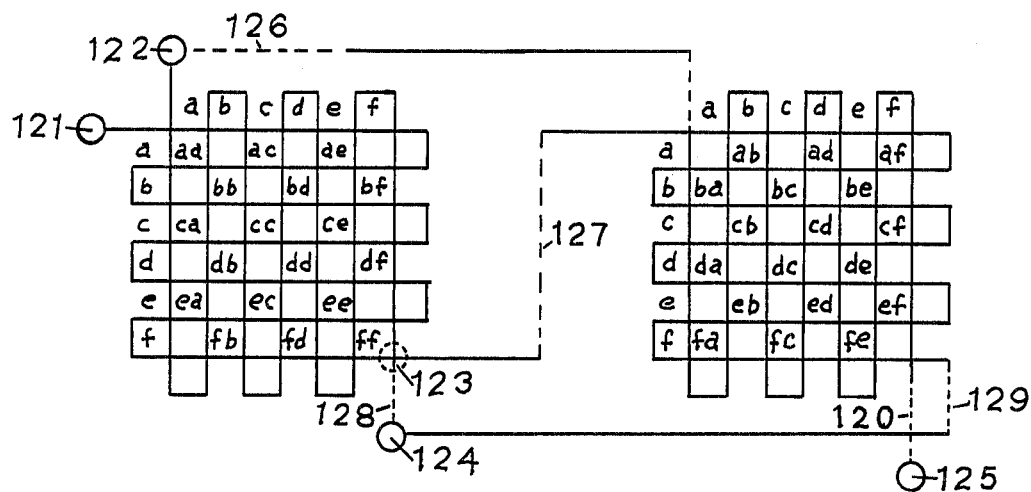
FIG.12    FIG.12a
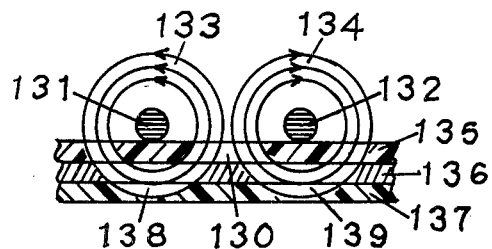    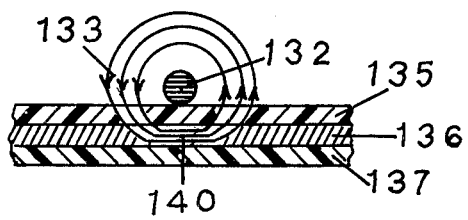
FIG.13    FIG.14
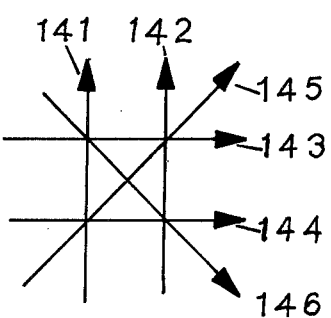    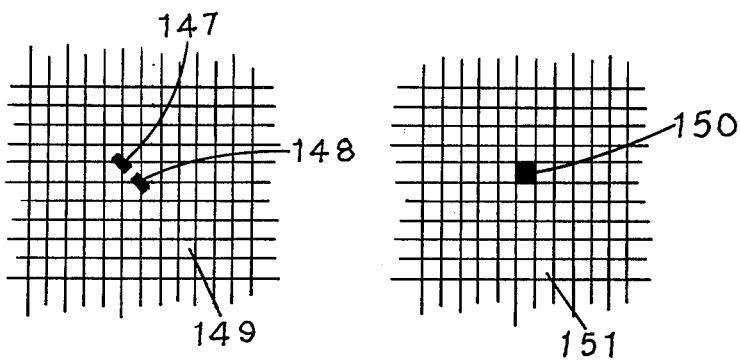
FIG.15    FIG.16    FIG.17
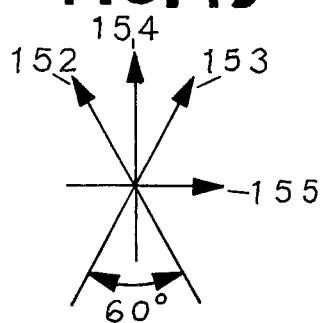    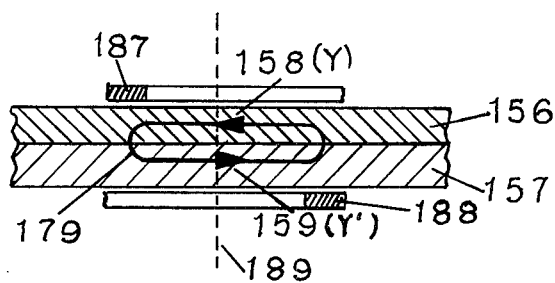
FIG.18    FIG.19

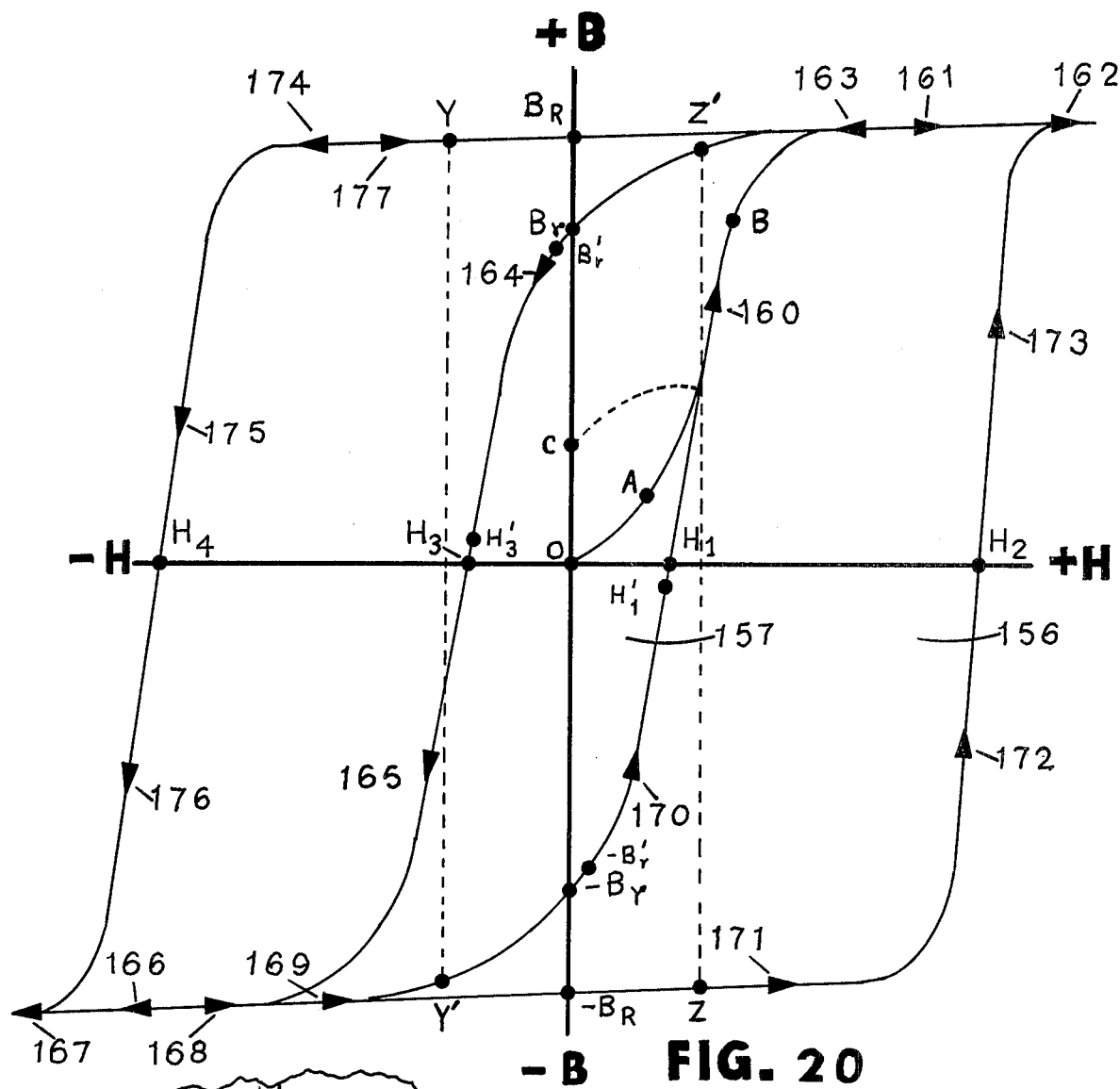
FIG. 20
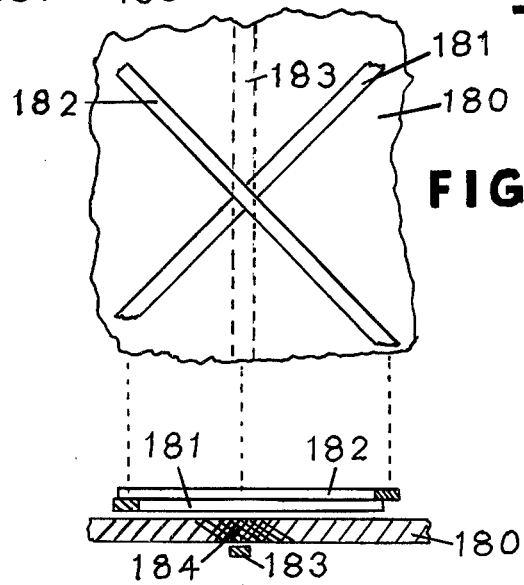
FIG. 21
FIG. 21a
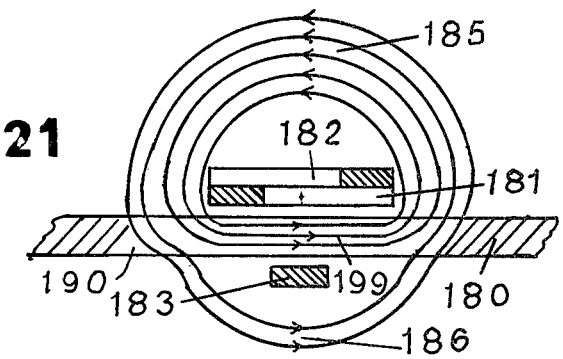
FIG. 22

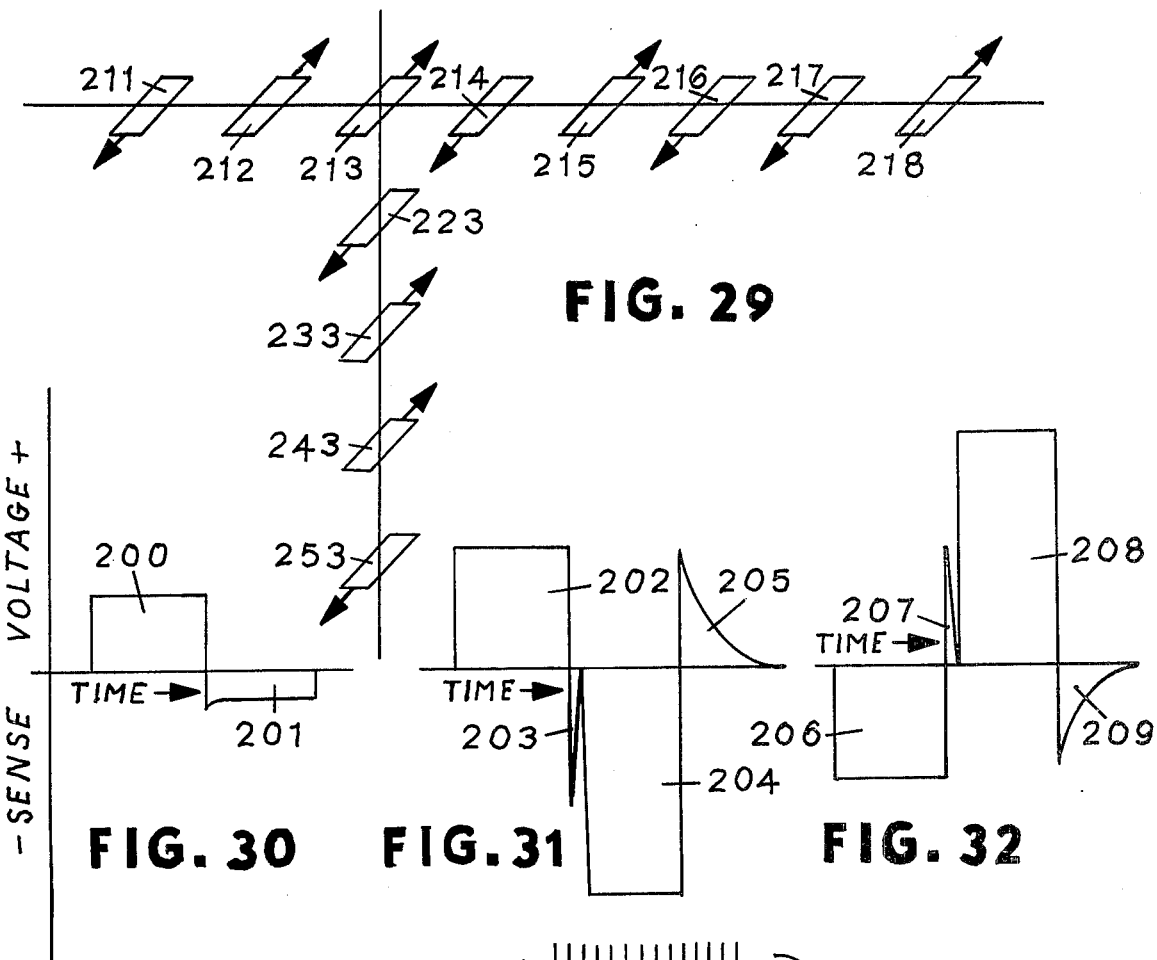
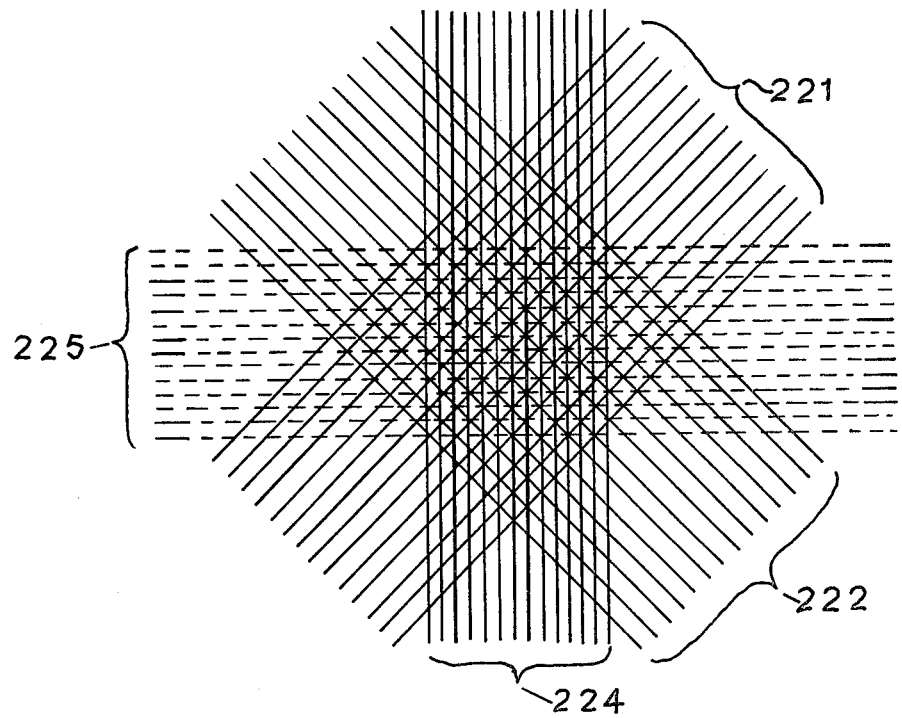

METHOD OF AND APPARATUS FOR SECURING AND STORING PERSONAL INFORMATION

This invention is related to the storage of information pertaining to people and their activities in modern computer code, to the control of this information, to its improved accessibility, and to the manipulation of this information as required by the multiple channels of commerce, industry, and society as a whole.

FIELD OF THE INVENTION

The invention relates to removable computer credit cards of the ferromagnetic storage variety, to new and improved means of placing information on ferromagnetic memory planes, and removing it therefrom, and particularly to method and means for securing the information stored on said cards to prevent illicit use thereof.

DESCRIPTION OF THE PRIOR ART

There are in existence several systems for detecting and preventing the unauthorized use of credit cards, the most common of which is the mere possession of a card having a multi-digit identification and account number, or at least space for such are often provided on credit cards; finger prints are sometimes used and occasionally photographs are provided for identification purposes.

Bryce, U.S. Pat. No. 2,254,933, provides a magnetic card, similar to the typical IBM punched card, which can be used for machine control, and which is certainly removable from a machine, but it does not provide any security features.

James, U.S. Pat. No. 2,914,746, provides an employee identification system for securing working areas, using magnetically encoded cards wherein the card holder is compared with a master card retained by the machine. James thus provides a means whereby the plant controls the magnetic encoding on the cards which he prescribes can be changed periodically as required, but the encoding is not under the control of the card holder. Using such a system for credit cards, the card issuing agency can be protected against forgery, but the card holder is afforded no protection against the theft of his card and its illicit use.

Enikeieff, et al., U.S. Pat. No. 3,221,304 is again a personnel identification system for the control of entry into and exit from security areas. The medium of identification is a card with a magnetic surface which can be encoded with various codes which can be written, erased and changed by apparatus of the invention. During entry into and exit from a security area, an individual enters a memorized code into a keyboard by pressing selected buttons thereon and thereafter inserts his identification card into the transport mechanism which carries the card through a magnetic reading path. If the code on the card corresponds to the code of the selected keyboard buttons, the individual is free to enter the security area or exit therefrom. If the card and button codes do not correspond, a barrier is automatically closed in front of the individual, an alarm sounded, and a guard summoned.

This, again, is a system that is totally under the control of an agency. The card holder has no control whatever over the system and therefore no control over his personal security. Furthermore, memorized codes are used, and known by more than one person, and as such, inherently have the possibility of being compromised. Too, the code is a symbol which occupies a certain position on the card rather than a key to programming or scrambling all of the information on the card.

Paterson, U.S. Pat. No. 3,588,449, discloses an apparatus for automatically dispensing currency on demand, to a customer of a bank by providing a memory which stores a secret "Swiss" bank number for each account, and which is addressable upon the entry of a customer's credit card. Manual entry of the correct "Swiss" bank number by the customer enables him to communicate with a currency dispensing unit.

Presti, U.S. Pat. No. 3,562,210 provides a magnetic tape strip of relatively small dimensions, on the back, face, or within the standard plastic credit card, having also embossed characters, and whereby a credit card imprinter, with small modification, can be used to provide automatic credit varification, etc. The operation on the card, and within the machine, is carried out in several phases or steps. Presti is primarily directed to procedures for carrying out commercial transactions by means of credit cards, establishing and checking limits for the transactions, and in determining whether or not the magnetically encoded area has been tampered with. As such, it offers little real security for the card holder and none that is under the exclusive control of the card owner.

Riddle, et al., U.S. Pat. No. 3,513,298 preferably use a thin magnetic recording medium laminated between two protecting layers to provide a credit card for bank savings account customers. Dual track recording and reading are provided whereby the customer, the Customer's Card and a cryptographic identifier perform all operations that are required. This invention, as with James and Enikieff, is not subject to complete identification control by the customer, or card holder, with the instantaneous privilege of changing selected identification characters or programming procedures.

Considering the state of the credit card art as practiced in the year 1976, even the foregoing security methods and means are very little practiced. Security, for the most part, is still limited to the mere possession of a card having a number and provided with a single-film magnetic encoding surface on which a few rather simple characters are encoded. The magnetic data on such cards can, and have been, easily erased by simply passing the card through a standard demagnetizing coil. What is of much greater importance, however, is that such cards can, and have been, "dusted" with magnetic powders and photographed with the encoded characters plainly visible to the naked eye. The only apparent things that save such a simple system from being compromised are the limits placed on the funds that can be transferred, and the relatively small volume of such business presently conducted. Once large amounts of money get transferred by this means, or the total volume of such transactions become sufficiently large to justify the cost of the equipment required, counterfeiters will enter this system with considerably less skill and apparatus than is presently required to counterfeit the currency.

With regard to ferromagnetic plano memory sheets, J. W. Bryce, above referenced, shows ferromagnetic sheet material sandwiched between non-magnetic material. He also shows granular magnetic material similarly sandwiched between nonmagnetic layers. He does not show sheets of two ferromagnetic materials having different magnetic properties, in intimite magnetic contact with each other and together forming a ferromagnetic memory medium.

R. E. Matick, et al., U.S. Pat. No. 3,436,749, disclose ferromagnetic memory elements comprised of two "thick" films of ferromagnetic materials, having different magnetic properties, in intimate magnetic contact with each other. But what they call "thick" is a film having a thickness of 3000 Angstroms; whereas, the individual sheets of the instant invention are 50 to 100 times this thick. Moreover, the films of referenced invention are in the form of small dots, or small circles, having a diameter of the order of 1/32 inch, with each circular device comprising a bit of information, and a magnetic memory comprising an array of such devices. Again, the two films are not used together, in the sense that we use them, to form a joint memory element; rather, they are used more-or-less separately with their "easy" axes of magnetization disposed at right angles to each other, and with one film designated as the "storage film" and the other film of the pair designated as the "read film". What's more, the bit "0" is represented by the remanent magnetization along an easy axis, and the bit "1" is represented by a partially, or completely demagnetized state.

A. V. Pohm, et al., U.S. Pat. No. 3,509,546, provide a sandwich of materials to form discrete switching cells, preferably of circular form, somewhat similar to those of Matick, et al. Their philosophy is to form discrete planor cells which replace the individual toroids of a classical core memory. Each cell consists of a small piece of ferromagnetic material, as 4-79 Permalloy that is of the order of ⅛th Mil thick, and several layers of switching circuits. Each storage area is defined by the magnetization produced in the piece of ferromagnetic material by a pair of crossing conductors carrying current of a pre-determined level, and the direction of magnetization is determined by one of two possible directions of current flow in the conductors. They also provide a transverse magnetic field; i.e., a field at an angle to the switching field, by means of other current-carrying conductors, to reduce the switching time by causing domain wall rotation as opposed to domain wall migration. They provide conductors on both sides of the layer of ferromagnetic material, use a single layer of ferromagnetic material of one kind, and a memory is comprised of a multiplicity of such discrete cells.

Shintaro Oshima, et al., U.S. Pat. No. 3,521,252, provide a magnetic memory element having two thin ferromagnetic films of differing coercive force, with the films disposed along and about a first conductor carrying current. Each film occupies substantially half the surface of the first conductor on which it is deposited, in a lengthwise direction, and the films have overlapping joints to get low magnetic resistance, but the magnetic storage is obtained in the magnetic circuit surrounding the conductor so that the storage, as far as this first conductor is concerned, is very similar to that obtained in toroid core memories which also surround or enclose one or more conductors. A second conductor in the form of a clip substantially at right-angles to the first conductor is used to magnetize the ferromagnetic films, in one direction or the other, to define a bit, and in this respect the device is like a planor film memory. Thus, the device might be said to be a hybrid of core and planor memories. Storage is accomplished by driving sufficient current through the second, or clip, conductor, there being also current flowing in the first conductor, to saturate the film having the greatest coercivity. Non-destructive read-out is accomplished by putting current through the second conductor, or clip, to saturate, or nearly so, the film having the lowest coercivity, but insufficient to saturate the film of highest coercivity, with the first conductor then acting as the sense conductor.

H. L. B. Gould, et al., U.S. Pat. No. 3,390,443, provide a ferromagnetic element, in the form of a "twister", wherein a helix of special ferromagnetic alloy is wound around a conductor carrying current, with the helix also carrying current, and a third conductor in the form of a wire which couples with the helix also being provided. The special ferromagnetic alloy has a constricted stable "wasp-waisted" or split hysteresis loop which occupies the first and third quadrants only, of the usual four-quadrant graph; however, the material can be processed to have a conventional four-quadrant hysteresis loop of different coercivities.

H. L. B. Gould, et al., U.S. Pat. No. 3,422,409, provide a ferromagnetic material of very special alloy composition and treatment having a composite hysteresis loop resembling the loop that would be obtained from two contiguous ferromagnetic materials of different coercivities. The geometry of their storage device is again that of the "twistor" and they provide arrays of twistors similar to the arrays of conventional toroidal core memories. They also provide a typical "waffle-iron" memory array wherein the composite ferromagnetic material is situated in a layer on top of the protruding posts or poles which cause the structure to resemble a waffle iron. The electrical windings are made about the protruding posts so that magnetization is through the thickness of the composite material, in separated areas, and not tangential thereto in unseparated areas.

R. E. Matick, U.S. Pat. No. 3,298,005 provides a read-only memory using discrete thick film memory cells of the type already described above in connection with U.S. Pat. No. 3,436,749.

D. A. Meier, U.S. Pat. No. 3,315,241, provides a memory matrix comprised of thin bistable ferromagnetic films deposited on rods and wherein two magnetic elements per bit are employed to reduce noise. The ferromagnetic film is composed of one substance identifiable by a single conventional hysteresis loop, and the activating-reading circuits are comprised of solenoids wound about the rods.

K. C. A. Bingham, et al., U.S. Pat. No. 3,325,792, provide a thin film ferromagnetic memory plane, having a thickness of the order of 0.1 micron, with the film deposited on a polished aluminum plate by evaporation techniques, and actuated by a conventional system of rectangular conductors. The thin film provided in this invention has a magnetic anisotropy such that small areas behave as individual magnetic domains having directions of magnetization which, in the absense of an applied field, lie parallel to the easy axis of the film in one of two stable directions. These directions can be switched by the application of a field to provide the "0", "1" bits of computer memory technology.

J. M. Brownlow, et al., U.S. Pat. No. 3,508,219 provide what they call a thin film memory keeper which is comprised of particles of a high permeability ferrite imbedded in a rubber, or rubber-like matrix. The memory plane itself consists of permalloy film which is capable of retaining flux at discrete spots within the plane of the film. The keeper is specified as having high permeability but no remanence. Actuating circuits are apparently conventional.

The design and manufacture of ferromagnetic memory devices, operating on the remanent magnetization of one or more magnetic materials is today a most sophisticated science and many patents have been granted in this field, each of which depends upon particular geometrical arrangements and/or material compositions and treatments. In addition to the above, for example, there is:

The pierced sheet memory of U.S. Pat. No. 2,912,677, issued Nov. 10, 1959 to R. L. Ashenhurst, et al., which is closely related to the toroidal core array memories, except that it is in sheet form;

The original "twistor" memory of U.S. Pat. No. 3,083,353, issued Mar. 26, 1963 to A. H. Bobeck; and Variously, electrically alterable permanent memory elements operating on the "piggy-back" principle of which U.S. Pat. No. 3,067,408, issued to W. A. Barrett, Jr. Dec. 4, 1962 is typical.

The instant invention derives from the use of two thick continuous, contiguous and substantially plane sheets of ferromagnetic materials having widely different coercivities, overlaid on one, or both, surfaces by electric circuits which produce remanent magnetic saturation along axes parallel with the plane of the sheets, with the magnetic saturation dominated by the material having the highest coercivity.

SUMMARY OF THE INVENTION

In this application, as in the application of which this is a part, and in all applications which have been divided from the original application, above referenced, a computer is any instrumentality which automatically stores, assimilates and processes information of any kind whatsoever, makes a register of results for visual inspection as well as for continued computation, compares presently taken data with that previously taken, rings a bell, flashes a light, closes or opens a door, or operates another machine.

The average computer stores all, or most, of the information it uses on the premises. This is true whether or not the computer internally contains all or part of the information in its memory banks, or stores all or part of this information on a system of cards, tapes, discs, drums, sheets, labels, etc. In any situation the information usually has to be located at the computer center which processes and uses it, or at least reasonably close thereto.

Again, the information fed into a computer, or stored within its memory banks, is usually the product of many people, and the suppliers of information more often than not, are not the actual users of the information supplied.

The information particularly pertinent to people and their activities, on the other hand, is both supplied by a person and/or family and used by that identical person or family. Accordingly, the logical place to store this information is on the person, or within the control of the person or family, and not in a remotely located computer center where the information storage facility is probably already over-loaded. At the same time, for a person to make full use of his personally-stored, and controlled, information in our modern high-speed world, it is sometimes necessary to make part or all of it available to a computer.

For example, a man might have a bank balance of so-many dollars. This is really only this particular man's personal business. At the same time, this man might wish to buy a tank of gas for his automobile, or purchase a new washing machine for his wife—on credit. Accordingly, both the Service Station Owner and the Department Store Owners have at least a momentary legitimate interest in the man's bank balance as well as his "pay habits". If both the bank balance and "pay habits" are available on the man in a form that can be recognized by computers in the possession of both merchants the dilemma can be readily solved without a word being exchanged. Given the momentary use of the man's information card, and with previously programmed instructions, the computer only needs to come up with one of two useful answers: "Sell" or "Don't Sell".

Another problem which we have in the modern world is that of stolen or improperly used credit cards. Even though signatures, and occasionally fingerprints, may be required, the legitimate use of a credit card cannot be certain unless hand-writing and fingerprint experts are on hand. At the present time we do not have computers with hand-writing and fingerprint expertise.

Still another problem that we have in the modern world is the illegitimate use of personal information by governments, corporations, or other large organizations. As above shown in the example of the merchants, governments, corporations and other organizations may from time-to-time have a legitimate temporary requirement for some portions of personal data which completely and permanently belongs only to a person. Accordingly, a means of supplying this information, and only this information, on a temporary basis, and with the consent of the owner, is required.

The fundamental object of this invention is to provide a relatively simple and inexpensive method and means whereby ownership of information may be established and stored in a convenient, compact and sure form. Another objective is to store this information, and ownership of same, in a form which can immediately be accepted into, and assimilated by a computer. Still another object is to store and release this information in such a manner that the release of personal information is always under the control of the person who truly owns said information. A fourth objective is to positively identify with a particular person, and in a manner as certain as a person's signature or fingerprints, a package of information said to belong and pertain to said particular person. A fifth objective is to provide a means whereby another person or agency can be given temporary (usually momentary) access to all, or any fraction, of a person's information, including the status of his ownership. A sixth objective is to provide a single standardized card and/or label which can be universally used by all individuals and all agencies. A seventh objective is to provide a computer system which can accept and assimilate information received from a wide variety of sources. A final object is to make use of electromagnetic phenomena in the storage of information that have not presently been applied.

These and other objects and features of the present invention will become completely clear upon consideration of the further specifications and drawings, wherein:

BRIEF DESCRIPTION OF THE DRAWINGS

FIG. 1 is a drawing of a typical punched card used by computers and often identified as an "IBM" card, a designation which comes from the originator of the card.

FIG. 2 is a sketch of several typical binary indicators which are employed in modern electronic computers.

FIG. 3 is a drawing of a modern plastic credit card.

FIGS. 4, 5 and 6 are drawings of the personal information dossier (PID) of this invention, showing top, edge and bottom views respectively.

FIGS. 11 and 11a are greatly enlarged views of one form of conductor pattern used by the preferred form of memory sheet of this invention.

FIGS. 12 and 12a are correspondingly greatly enlarged views of another conductor pattern used by the preferred form of memory sheet of this invention.

FIG. 13 is a drawing in cross-sectional view showing the magnetic field about two typical conductors from the schematic patterns of FIGS. 11 or 12 in relation to the memory sheet, or card, of this invention.

FIG. 14 is a drawing in cross-sectional view, similar to FIG. 13, but showing the magnetic field about a single conductor in relation to the memory sheet, or card, of this invention.

FIG. 15 is a drawing showing the schematic arrangement of conductors, and the direction of the magnetic field resulting therefrom, in the preferred embodiment for writing on, and reading from, the preferred form of memory sheet of this invention.

FIG. 16 is a schematic drawing of drive and/or sensing lines which follow the pattern of FIG. 15, and wherein information bits are formed at the diagonal crossing of two lines by the tangential component of the magnetic field as shown in FIG. 14.

FIG. 17 is a schematic drawing of drive and/or sensing lines which follow the pattern of FIGS. 11 and 12, and wherein information bits are formed within the boundaries of a square by the vertical component of the magnetic field as shown by FIG. 13.

FIG. 18 is a schematic drawing showing that the crossing of drive lines need not necessarily be orthogonal.

FIG. 19 is a cross-section of a two-layer ferromagnetic memory sheet, in support of FIG. 20, showing how the layer of high coercivity drives the layer of low coercivity.

FIG. 20 is a typical graph of the hysteresis loops of a two-layer ferromagnetic memory substance.

FIGS. 21 and 21a, in plan and elevation views respectively, are enlarged drawings of crossing drive lines on one side of a ferromagnetic memory layer, in the form of a magnetic screen or shield, with a typical sense line on the opposite side of the screen.

FIG. 22 is the cross-section of FIG. 21a, still further enlarged to show how the flow of lines of magnetic flux couple the sense line when the magnetic screen is saturated.

FIG. 23 represents a "1", for example, FIG. 26 represents a "0".

FIG. 29 is a diagramatic outline of an array of magnetically oriented storage windows in a magnetic screen.

FIG. 30 is a graph of the sense voltage produced by a pulse in a single drive line, showing that the response is always greater to an open window than it is to a closing window.

FIG. 31 is a graph of the sense voltage produced when the storage bit of FIG. 23 is destructively read.

FIG. 32 is a graph of the sense voltage produced when the storage bit of FIG. 26 is destructively read.

FIG. 33 is a schematic drawing of the final complete arrangement of drive and sense lines.

DETAILED DESCRIPTION OF PREFERRED EMBODIMENTS

Figure 7:
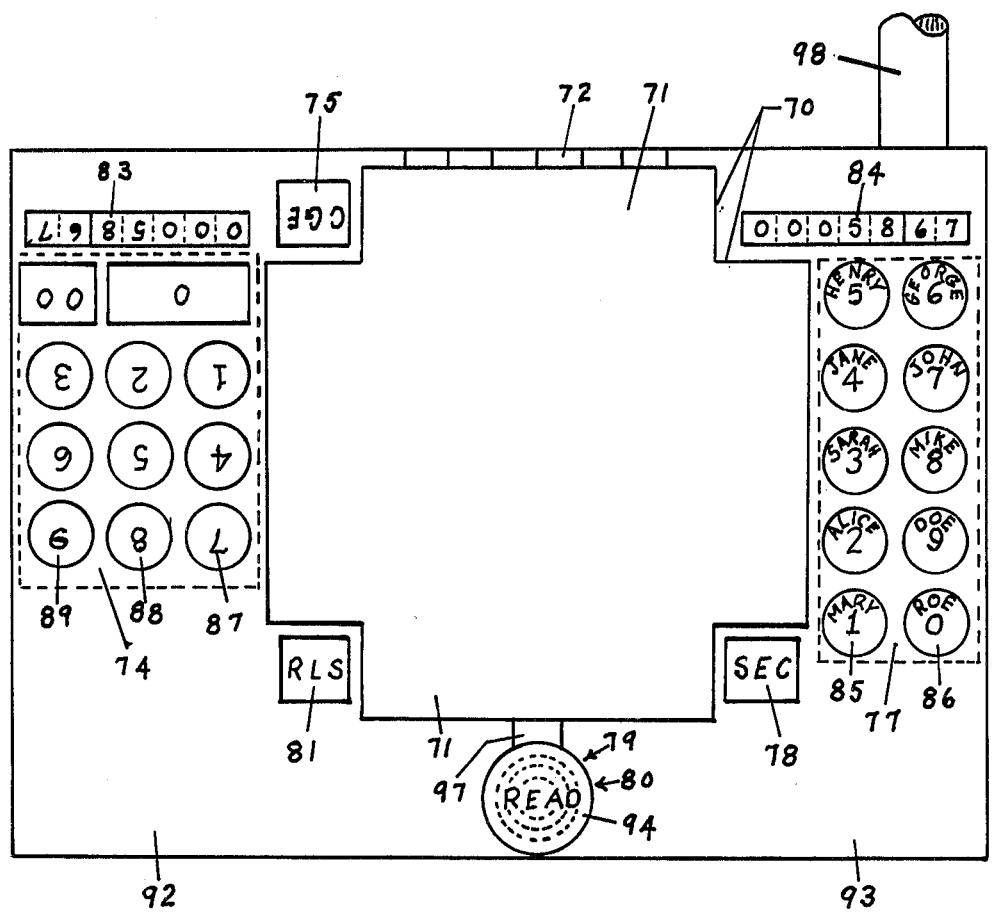
FIG. 7 is a drawing in plan view of one form of information read-write computer head of this invention, with the cover down and the head in the closed or operational condition.

FIGS. 1, 3 and 4 illustrate typical areas where personal information is required and some forms of how it is being stored at the time my invention was made. Referring to FIG. 1 specifically, 11 indicates a typical punched card capable of storing some 960 bits of information—a bit, in the language of computer technology, being a "1" or a "0" of the binary code, and the "1.0" combination representing the two possible states of many storage devices, as depicted by FIG. 2 and as will more fully be described subsequently. Returning to FIG. 1, 12 is the slanted corner of the punched card by means of which the card is oriented in punching and reading machines; 13 refers to typical punches, or "1's" on the card; 14 refers to typical unpunched positions on the card, or "0's"; and 15 refers to the printing on the card that is used in identifying areas or in giving instructions. 16 refers to numbers which identify rows and columns on the card.

FIG. 3 shows a typical plastic credit card 17 as today provided by many merchants, banks and credit agencies. 18 indicates the name of the company issuing the credit card; 21 is the name of the person to whom the card is issued; 19 is the credit card account number; and 20 refers to a number of marks on the card which serve in the same capacity as punches on a punched card and provides some small amount of information for the issuing company. Items 19, 20 and 21 are usually in the form of raised or embossed characters. Additionally, and since the first filling of this application, many credit cards are now provided with ferromagnetic storage areas in the form of strips on the front or back surfaces whereby so-called electronic banking operations are carried out. These cards, however, do not have any security features other than mere possession or occasionally a photograph or signature.

Cards, such as that of FIG. 3, are today issued by many companies through the mail to people, and often without having ever been requested. The average adult in the U.S. today carries a half-dozen or more such cards in pocket, wallet and/or purse, and for which he or she is usually made responsible, with no means of protection whatever provided. Almost any one can use anybody's card with no questions asked.

Another problem with which any generalized system of personal information must ultimately be concerned is the storage problem itself. It can be shown that if 100 pieces of information pertaining to and completely identifying each of the more than 200-million people of the U.S., with each piece of information having an average of only 3 words, was stored in central computer by the most compact and condensed storage means and techniques presently available, a facility 100×100×100 feet=1 million cubic feet, would be required. To gain access to so vast a storge and make it available in all parts of the world, where today people travel, at all times of the day and night, would not only require a gigantic high-speed sorting mechanism, many duplicating facilities, but equally gigantic interconnectong cables and networks. Again, since personal information changes from day to day, means for changing, adding to, or deleting information would have to be provided and disciplined. Perhaps the worst feature, however, is that once personal information is given any kind of general storage, the person whose property the information is, loses control of it. This adverse feature of the modern computer grows in daily importance, and in future years will have even greater negative impact as we become victims of our own computers. Even when no dishonest or unscrupulous intentions are present, if one's account or personnel record gets "fouled up" in a computer, it takes practically a letter to the president of the company to get the matter straightened out. The usual computer file clerk pays no attention whatever to letters, is as incoherent as an unprogrammed computer, and unless some means for individually entering complaints on a punched card is one day provided, the situation appears hopeless.

Considering all problems relevant to people and their activities as individuals, the present invention provides a solution through the recognition of the following principles:

1. The person who provides the information is the only legitimate owner of the information provided;
2. The person who provides the information is involved in each and every transaction of the information and should usually be present at the transaction;
3. People or agencies other than the individual who owns the information may have a legal or legitimate requirement for portions of the information on a permanent basis;
4. People or agencies other than the individual who owns the informaton may have, or be given, a temporary legitimate use of portions of the information;
5. When the person who provides the information is not present at a transaction, there is, nor can be, no legal or legitimate requirement for the information. Being present in the sense of this principle is not necessarily restricted to exact geographical presence. If a person in Chicago of his own volition puts his information dossier into a computer that communicates with New York, for example, and for the express purpose of doing business in New York, this person is present in New York for the particular transaction carried out by the computer into which he puts his dossier.

When these principles are fully understood and recognized, it is found that all problems relating to people and their activities in the modern world can be solved by:

I. Providng each person and/or item of goods with a dossier of information, or a memory label, in a form that can be mechanically handled and the information thereon assimilated by a computer;
II. By each person or agency wishing to avail itself of all or any part of said information dossier, or label, providing itself with a computer capable of intercepting and assimilating said information when given permission to do so;
III. By providing a non-forgable act of individual volition for the release of information from a personal information dossier, other than the mere presentation of the dossier.

In the present invention, use is made of magnetically-stored bits, as 52 and 53, FIG. 2, or 60 and 61, with the storage being made upon one or more thin films of magnetic material, as 25 of FIG. 5, which lays the full extent of the card in both planor directions and which is sandwiched between two thin pieces of non-magnetic material 24 and 26. The non-magnetic material can be plastic, paper, or some equally suitable substance, while the magnetic material in the most simple form may be a single sheet of material similar to that presently used by magnetic recording tapes. In the preferred embodiment of this invention, however, the magnetic material 25 is comprised of two sheets of magnetic material in close relationship as will be subsequently described and explained.

While we could use magnetized and non-magnetized states for our bit code, and this has been done in some of the art cited, it is preferable to use the two possible directions of magnetic saturation. We can arbitrarily say, for example, that when the North Pole of a magnetized spot is on the underside of the card, with the South Pole on top, we have a "0"; while if the North Pole is on top and the South Pole down under, we have a "1". Alternatively, when use is made of the tangential component of the magnetic field about a conductor carrying current, as will be further explained, we can say that a "0" is when this field bit points left, and a "1" is when it points right. Such arrangements completely conform to present computer practice and thereby avoid interpolation units. Again, areas that are completely saturated magnetically in one direction or the other, in materials of adequate coercivity, are nearly immune to demagnetization by extraneous fields because it requires a field sufficiently strong to flip the direction of magnetization over to the opposite direction of saturation to do any damage.

With the bit areas of each card thus magnetized, two methods of read-out are possible. The card can be placed in the read-write head, FIGS. 7, 8 and 10, the handle knob 94 pushed down suddenly, bringing the cover 71 against the face of the card that has previously been inserted under the cover, and thus plunging the card into immediate and intimate contact with the reader head pole structure. This sudden action closing the gaps between tiny card vertically-polarized magnetic areas generates voltage in the little coils wound around each pole of the reader head, or in the printed circuit networks used therein in place of coils.

The polarity of the voltages and hence the direction of flow of currents in the coils will depend upon the polarity of the magnetic spots on the PID card, and the direction of these currents determines whether an "0" or a "1" is represented. In this embodiment of the invention, suited only to the very simplest applications, each coil of the read-write head would be required to have separate connections into a computer circuit.

The other types of read-out possible wth our binary-coded system are what, in computer terminology, are called destructive, and non-destructive, read-out. In both, systems of drive and sense lines, usually in the form of printed circuits when planor memories are employed as in this invention, are provided whereby currents in the drive lines produce identifiable responses in the sense lines, and these responses indicate the state of each memory element: whether the magnetic storage found there is in agreement, or disagreement, with the direction of drive. Since the storage of each memory element is at $\pm B_4$, the two points of retentivity, a positive drive for a $+B_4$ memory element will give a small response because there is little room between $+B_4$ and $+B_{sat}$ (See FIG. 20). On the other hand, a negative drive for a $+B_4$ memory-element will give a large response because there is a lot of room between $+B_4$ and $-B_{sat}$. $\pm B_{sat}$ are, of course, the flux densities at positive and negative saturation. Similar considerations to those above given for $+B_r$ apply to $-B_4$.

Destructive read-out occurs when the drive is in that direction which disagrees with the polarity of the storage element, and is of sufficient magnitude to drive the storage element to, or beyond, the opposite saturation point; i.e., when a $+B_r$ memory element, or bit, is driven to $-B_{sat}$, and when a $-B_r$ memory element, or bit, is driven to $+B_{sat}$ and then left at $+B_r$.

Non-destructive read-out occurs when a memory element is driven only a small distance from the storage points $\pm B_r$ and returns to its storage point after the drive ends.

When one examines critically the magnetic properties of the information storage system thus far disclosed, it will be seen that some further improvements are in order. To do this we shall first consider the hysteresis loop followed by all ferromagnetic materials, as shown by FIG. 20, where magnetomotive force, MMF, H, is plotted against magnetic flux density B. When MMF is applied to all such materials, magnetic flux flows in the material and rises along the initial magnetization curve OAB, as indicated by arrow 160, to saturation value 163 ($H_{sat}$, $B_{sat}$), as shown by arrow 162. If the MMF is now decreased, the flux density does not follow back down the initial magnetization curve; rather it follows the path 163 to an interception of the B-axis at $B_r$ and thence along the well-known demagnetization curve through the points 164, 165, 166 and 167, as the MMF goes negative; then as the MMF decreases from a negative maximum, and the drive goes positive to complete the cycle, the hysteresis loop follows the arrows 168 and 170 back to 160.

For the first few MMF cycles, the hysteresis loop does not completely close but after a sufficient number of MMF cycles, the hysteresis loop is to all effects and purposes closed, and that is the loop which is platted in FIG. 20.

The values $B_r$ and $-B_4$ are called the retentivity of the magnetic material, as noted. These points cannot ever be ideally occupied except in a completely closed magnetic ring, and because of this fact magnetic memories in computers are often comprised of planes of hundreds of such rings, each tiny ring comprising a bit in the computer memory, as shown by 52 and 53, FIG. 2. When a closed magnetic ring is magnetized to 162, FIG. 20, and allowed to fall back to $B_r$, we have a "1-state" of the binary code; while if a ring is magnetized to 167 and allowed to fall back to $-B_r$, we have a "0-state". It is obvious that these two stages are arbitrarily chosen, have only relative significance, and no meaning until a choice is made by the specific connections of a particular computer. Theoretically, the exact intercepts, $B_r$ and $-B_r$, Can never be sat upon in a static system because even the very best ferromagnetic materials have some reluctance and there invariably is some flux leakage even from a ring. Accordingly, the very best we can do in computer practice is rest at $B_r'$ or $-B_r'$; however, $B_r'$ and $B_r$ may be so close together in reasonably good materials that it would be difficult to distinguish between them. The point to be made here is that we do not have to occupy $B_r$ and $-B_r$ precisely to have good effective computer memory elements.

The intercepts $H_1$ and $H_3$ of the hysteresis loop 157 are called the coercive points for this particular material. These are the positions occupied by perfectly-open hard, or semi-hard, magnetized magnetic materials; i.e., permanent magnets. Like the $B_4$ points which are not ideally occupied because no ring of material, and certainly no planor material, is ever perfectly closed, the $H_c$ points cannot be ideally occupied either because no finite piece of ferromagnetic material is ever completely open; hence we have the points $H_1'$ and $H_3'$. In a long needle-like piece of material which has minimum surface and hence minimum leakage, the points $H_1$ and $H_1'$ may be graphically indistinguishable. Similarly, the points $H_3$ and $H_3'$. As with the $B_r$ points, the fact that we never ideally rest on $H_1$ or $H_3$ does not keep us from utilizing permanent magnets because we usually convey the flux from a permanent magnet to some working gap and consequently ride back up on the demagnetization curve to some useful point such as 178.

In a magnetic recording medium, the strength of the pole is fixed by the product of the coercive force, $H_1$ or $H_3$, which is an intrinsic property of the material, and the length of the pole. This brings out the weakness of the bit dots formed by the vertical component of the magnetic-field on the PID card, FIGS. 2 and 4 through 6, when a single simple isotropic magnetic sheet is used, unless 25 is made fairly thick. If 25 is greatly thickened, both the weight and cost of the PID card will be greatly increased as well as the current required to write on it and read it; at the same time, the reliability of storage in a single, thin, completely-open (or nearly so) magnetic medium is not always as good as one would like it to be.

What we would really like to obtain in plane sheet form is the ideal ferromagnetic storage system provided by the closed magnetic ring. Such is essentially provided by the structure of FIG. 19, the performance of which is described by the hysteresis loops of FIG. 20, for the materials 156 and 157. The hysteresis loop for material 157 has already been traced above, so we go now to material 156. The MMF at arrow 162 is sufficient to produce saturation in both 156 and 157, and when reduced and driven negatively and thence through a complete MMF cycle, the action in material 156 follows the path 174, 175, 176, 167, 168, 169, 171, 172, 173 back to 162.

If at this point, 162, when both foils have been saturated, the MMF is suddenly reduced to zero, as in the application of rectangular pulses, a little of the magnetic energy stored in the field of the foils gets dissipated and the flux falls along the common path of arrow 163 where it branches out in the paths 164 and 174.

If the two foils 156 and 157 were isolated and by themselves formed closed magnetic loops, the action would stop at the points represented by $B_r$ and $B_R$, respectively. If, on the other hand, foils 156 and 157 are isolated and completely open magnetically, no flux can flow and the action in the foils is obliged to fall to points $H_3$ and $H_4$, respectively, where the positions are maintained by magnetic domain orientations in the films called permanent magnetism. If this orientation is sufficiently strong to resist all demagnetizing forces, including thermal agitation, and the foils remain open, they would remain indefinitely at points $H_3$ and $H_4$.

Our two magnetic foils are not, however, either completely open nor completely closed, but they are more nearly closed than open; accordingly, the foil 156, having the greatest coercive force, will begin driving the weaker foil, 157, the moment the coercive force $H_3$ is exceeded in the negative direction. Positive flux will flow in foil 156, following the path of arrow 177, driving negative flux through foil 157, as indicated by arrow 169; at least this is what happens if foil 156 is alone and we bring foil 157 up to it. Of course the two foils are together all the time; consequently, the point $H_4$ on foil 156 may never be occupied in the absence of an external driving MMF; rather, as shown, and as soon as the coercive force of foil 157 is exceeded, negative flux begins flowing in foil 157, and stability is achieved when at a common MMF nearly identical amounts of flux are flowing in foils 157 and 156. This is the position indicated by the dotted line, and points, YY'. Since there is some flux leakage from foil 156, the flux actually driven by 156 through 157 will be slightly less than the flux flowing through 156. Thus, the two foils will internally hold each other locked in position until an external driving MMF of sufficient magnitude, and in the required direction, unlocks them.

In our magnetic memory application, the bit storage positions are the induction lines YY' and ZZ', one position representing a "1", and the other position representing a "0". The YY' bit position is achieved by applying a positive MMF in excess of the value necessary to achieve $B_{sat}$, arrow 162; while the ZZ' bit position is achieved by applying a negative MMF in excess of the amount necessary to achieve $-B_{sat}$, arrow 167.

Full read-out can be achieved either destructively or non-destructively. For destructive read-out, MMF's of magnitudes sufficient to saturate both foils are applied, as noted. For non-destructive read-out, MMF's of magnitudes sufficient to demagnetize foil 157, but insufficient to demagnetize foil 156, are applied, and this will give a full signal swing in the readout circuit, since a full swing of flux from $-B_r$ to $+B_r$ is achieved. But once this readout MMF is removed, the locked cell will fall back to its initial position, since in this readout operation, foil 156 has not been demagnetized. This is a form of readout that is not easy to achieve in other forms of magnetic storage. The locked cell operates essentially as any yoked magnetic system; for example, a meter which can be swung to maximum reading without demagnetizing the permanent magnet therein.

One embodiment of read-write head of this invention consists of an assemblage of printed circuits of the form of FIGS. 11 and 11a on the sides of the recording medium of FIG. 19, respectively, with thin insulating films placed between the printed circuits and the recording medium. FIGS. 12 and 12a show another form which the printed circiuts can take when vertically polarized memory elements are employed.

FIGS. 11, 11a, 12 and 12a show orthogonal arrays of conductors forming loops of current around storage elements as depicted also by FIG. 17 where 150 is such a storage element or area. As noted, these arrays are well suited for the general arrangement where we have totally enclosed magnetic systems that link the current loops. This arrangement of conductors is typified by FIG. 13 where 131 and 132 are any two adjacent column conductors of FIG. 12, for example, and 119 is any row conductor of the same figure, there being an adjacent row conductor in front of, or behind, 119, and with 131 and 132 form a current loop and thereby defining a memory bit. The lines of magnetic flux shown in FIG. 13, 133 and 134, are those which flow around the respective conductors 131 and 132, which combine to create the central vertical component of flux, 130, of the system. Similar flux lines will flow from conductor 119 and its companion that is off the paper in one direction or the other, as stated. In FIG. 13, 135 and 137 are the thin layers of non-magnetic electrically insulating material between which the ferromagnetic material 136 is sandwiched. 138 and 139 indicate the opposing unused tangential components of magnetic flux.

The field at the center of a solenoid is given by the well-known formula $$B_z = 4\pi N \mu I, \text{ e.m.u.} \quad (1)$$

where
$B_z$ is the vertical component of magnetic field in the XY-plane, in gauss;
N = the number of turns in the solenoid;
I = the current in e.m.u., or Abamps. = 10 Prac. Amps.

If our external sheet of material is comprised of 100,000 permeability material, the effective permeability of the region in which the flux flows, with all structures and air gaps reduced to a minimum, could quite easily be made as high as 10,000, so that with a 2-turn loop, one top and one bottom, we'd have $$B_z = 8\pi 10^4 I = 25.12 \times 10^4 I, \text{ gauss} \quad (2)$$

If I = 1 Prac. Amp.

$$B_z = 25,120 \text{ gauss,}$$

and this is more than sufficient to saturate the central memory material —even in the vertical or hardest direction; moreover, since the current pulses do not have to last more than a micro-second, one can use energizing currents larger than 1 Amp; for example, 10 Amps. If this is done, and the central saturating flux has to be only about 12,500 gauss, at the very most, then one could get away with an effective permeability for the region of about 500. This shouldn't be very difficult to come by.

Considering now the application of the tangential component of magnetic flux about a conductor carrying current, as illustrated in FIG. 14, 131 is such a conductor, 136 is the magnetic medium sandwiched between the non-magnetic, electrically-insulating layers 135 and 137, Biot and Savart's law for a single wire gives the magnetic field to $$B=2\ \mu I/a, \text{ e.m.u.} \tag{3}$$

where B is in gauss anywhere in a circle of radius a-cms around a conductor carrying I Abamps of current.

If we have a conductor of 0.005 Cm radius lieing right on top of a sheet of material of high permeability, as indicated by FIG. 14, $$B=2\ \mu I/0.005=400I \text{ gauss.} \tag{4}$$

Accordingly, the product $\mu I$ only needs to be of the order of 30 for saturation; therefore, if the effective permeability of the region is only 100, I needs to be only 0.3 Abamp, or 3 Prac. Amp.

The current meshes for this kind of operation would be directed a little differently than for loops; they would want to be in parallel pairs, 141, 142 and 143, 144, FIG. 15. The current for each square would effectively summarize along the diagonal, 145, to the square, yielding $$I_D = 4 \times 0.707 I, \tag{5}$$

assuming I Amps flow in each of the four conductors, so that if this array is in contact with a magnetic film, the field would be $$B_D = (2 \times 2.828\ \mu I/a) = (5.656\ \mu I/a) \tag{6}$$

where $B_D$ is directed along the line 146, FIG. 15.

Assuming that the parallel conductors are practically touching each other, except for thin films of insulation, and there is no reason not to put them this closely together, we can use the figure a=0.005 Cm., as before, so that $$B_D = 5.656\ \mu I/0.005 = 1131 \mu I, \text{ gauss} \tag{7}$$

Thus, if $\mu = 100$, I need only be 0.1 Abamp, or 1 Prac. Amp. to get a field of 11,000 gauss in the magnetic foil.

Another consideration is that two pairs of wires are not required to define a bit; nor is it essential that the crossings be orthogonal. Any crossing of two wires at any angle can be used to define a bit, as shown in FIG. 18.

For example, if the conductors make an angle of 60° with each other, as in FIG. 18, and each carries I Abamp.

$$I_D = 2 \times 0.8660 I = 1.732 I, \tag{8}$$

where I is the current in each conductor. With this pair resting on magnetic foil, the field will be $$B_D = 3.464\ \mu I/a, \tag{9}$$

and, if a =0.005 Cm., $\mu = 100$, and I=0.2 Abamp $$B_D = 13,856 \text{ gauss.} \tag{10}$$

An interesting situation arises when we have two ferromagnetic foils with which we wish to form a closed magnetic system as in FIG. 19. We place the foils 156 and 157 between two crossing conductors, 187 and 188, with the currents in the conductors oppositely directed and adjusted in magnitude to magnetically saturate both foils. The saturating fields will then form a closed magnetic loop of flux, 179, as previously described in connection with FIG. 20.

We come now to one of the most important aspects of the present invention—that of personal information security. As already stated, the information on the card, and the license to use any or all of it must primarily remain with the owner of the card at all times. Secondary control should also be available to the agency that issues the PID card, or otherwise joins with the actual owner of the card in taking responsibility for the card's use.

It may not have been noted that the PID card of FIGS. 3 and 4 through 6 is perfectly rectangular and has no orientation marks or edges as does the standard punched card of FIG. 1, for example, where the slanting edge 12 is purposely provided to prevent cards from being placed in a reader in any other than one orientation. In the present invention, we purposely make it possible for the PID card to be placed in the read-write head in at least eight orientations, labeled Mary, Alice, Sarah, Jane, Henry, George, John and Mike, or carrying corresponding numbers 1 through 8 in case people don't like assumed names. For this purpose, the cross configuration of the read-write head displayed in FIGS. 7 and 10 has been provided. The choice of orientation of PID cards in the read-write head is at the option of the owner of the card, and is the first element of security. All that is required is that the card owner remember at next use of the card who he was at last use, and that he puts the card in the read-write head accordingly.

As was pointed out above, the array of 1.0 bits is meaningless until one gives some meaning to them; i.e., programs them. The orientation of the card in the read-write head is the first act in programming this card, and this is a security programming act.

Figure 8:
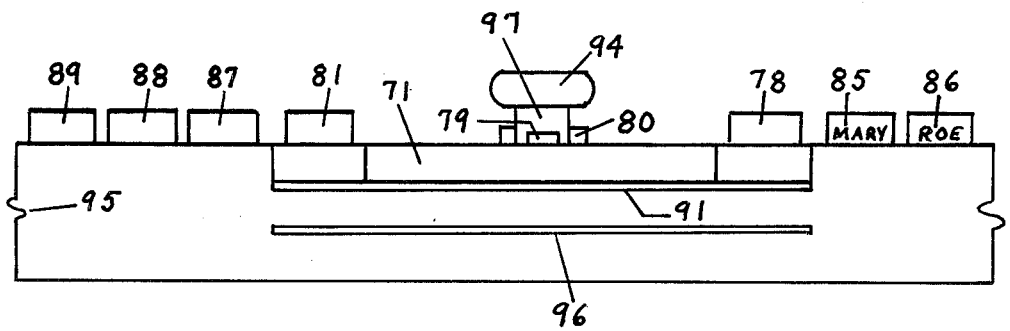
FIG. 8 is an elevation of the read-write computer head of FIG. 7.
Figure 10:
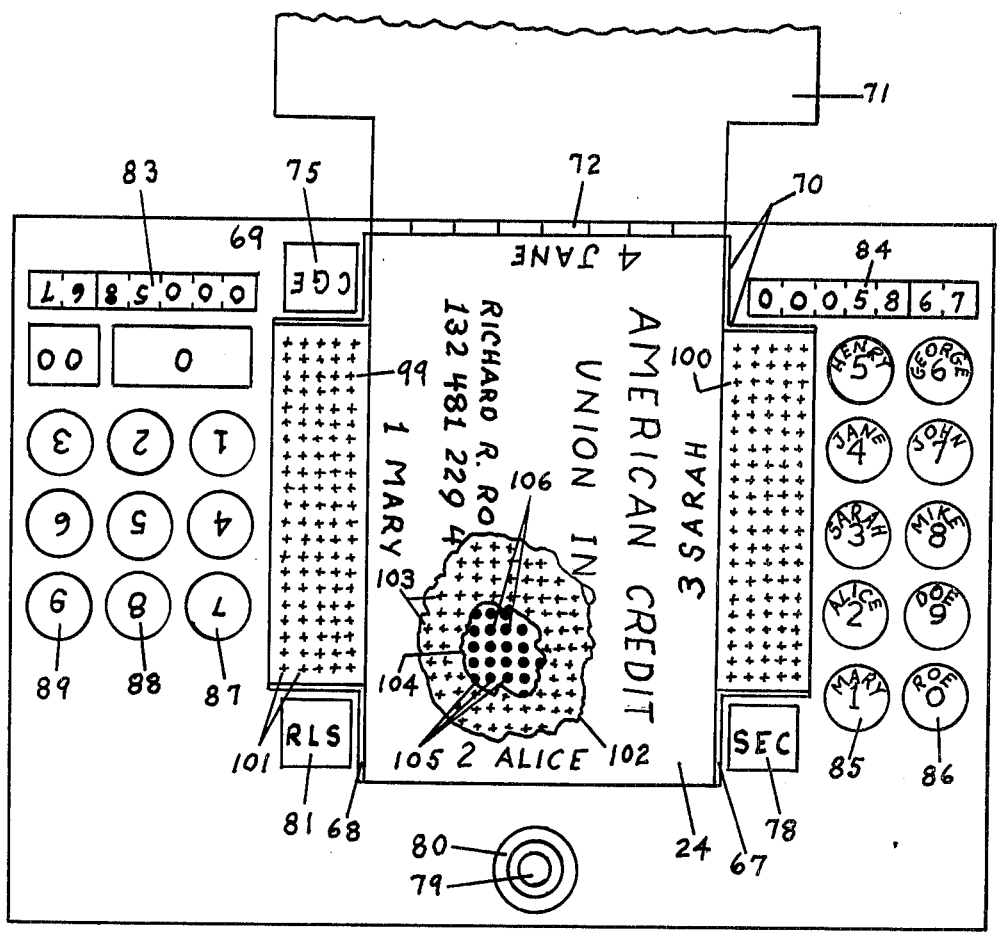
FIG. 10 is a drawing in plan view of the read-write head of FIG. 7, with the cover open and the personal information dossier (PID) of FIG. 4 shown in one of eight possible geometric orientations.

For the computer to make sense out of the array of bits on the card, it is only required that the card be placed in the read-write head—next use, in identically the position it occupied when the computer put the information on the card—last use. Thus, if the card owner elects to be Mary at last use, he or she must be Mary at next use. But he or she need not remain Mary forever, because as shown in FIGS. 7, 8 and 10, a set of buttons labeled Mary, Alice, Sarah, Jane, Henry, George, John and Mike can be provided in the register 77 by punching the SEC button 78, followed by the appropriate button from the register 77. In other words, the computer will have built into it a program of how to get from any one of eight names to any other of eight names. To provide a more complicated personal security system having more than eight choices, it is only necessary to give up the card orientation scheme and use the security buttons altogether. Several methods for doing this will be given subsequently.

In FIGS. 7 and 10, reference numerals 87, 88 and 89 refer generally to the keys of the payout register 74, while 85 and 86 typically refer to keys of the security register, 77. 92 and 93 indicate spaces that have been left where additional keys can be put whereby other programs can be given to the computer. 67, 68, 69 and 70 refer to corner card guide and positioning edges whereby the PID card is accurately located in the head. 72 is a hinge which permits cover 71 to be lifted, and 97 is the handle which attaches knob 94 to cover 71. Reference numerals 99 and 100 indicate read-write head areas not being used when the PID card is in the position shown but which would be used if the card was turned at right angles.

102 represents a cut-away in the PID card whereby the surface of the head is exposed, and pole locations noted, as 103. Similarly, 104 is a cut-away in the surface of the head exposing the actual circular pole structure 105 of the head. This is a physical structure which, however, is not essential in all embodiments of the apparatus. The printed circuits which carry the writing and reading currents do not usually require a physical pole structure; nevertheless, the poles of magnetism will be present whether or not they are assisted by a physical structure.

Referring to FIG. 8, 95 indicates a break in the head mechanical structure whereby the depth of the read-write machine can be extended as may be required by particular models of manufacture. In other words, the read-write head structure is not considered fixed by what is illustrated; the drawings are representative only of some of the functions and operations than can be carried out. The head can be fabricated as a very simple machine which takes care only of the specific operational functions of a specific set of transactions. Alternatively, the read-write head can be expanded to include many or all of the computer operations which must be, or can be, carried out at each local setup.

FIGS. 11 and 11a show one way of connecting and driving a pattern of rectangular conductors. These conductors are arranged in columns a, b, c, d, e, f, ..., and the rows are similarly labeled a, b, c, d, e, f, ..., rows and columns being those areas which lie between a pair of conductors. Thus, rows and columns each cover all areas of the sheet, and in any particular instance produce squares aa, ab, ac, ..., ba, bb, bc ..., each of which is common to some particular row and some particular column. Column conductors are driven from terminals 101 through 108; while row conductors are driven from terminals 111 through 118, with the head and arrow terminations indicating continuations of the pattern. The corresponding row currents are $i_a$, $i_b$, $i_c$, $i_d$, $i_e$, $i_f$, ... ; while the column currents are $j_a$, $j_b$, $j_c$, $j_d$, $j_e$, $j_f$, ... If, as in standard computer practice, row and column currents are pulses, with each pulse having an amplitude equal to ½ the current it takes to saturate the magnetic volume 150, FIG. 17, for example, when these currents enclose the same square area, as aa, FIG. 11, the flux density is sufficient to saturate this area magnetically to form a bit. There is, however, one distinct difference as compared with standard computer practice. In the present invention, closed current loops are formed only when row and column currents, bounding a particular square, flow simultaneously. It will be further noted that with each particular scanning situation, only alternate squares get magnetized, as aa, ac, ae, ... bb, bd, bf, ..., etc., to form a checkerboard array. In the alternate, unmarked squares, as ab, FIG. 11, it is seen that row and column currents oppose each other so that the square is not magnetized. Furthermore, alternate row patterns that are magnetized will be oppositely poled.

Figure 9A:
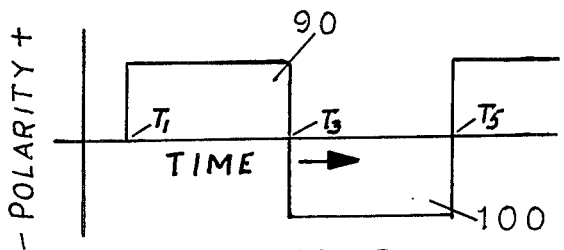
FIGS. 9a and 9b are graphs illustrating sequences of pulses to read from, and write on, the preferred form of memory sheet of this invention.
Figure 9B:
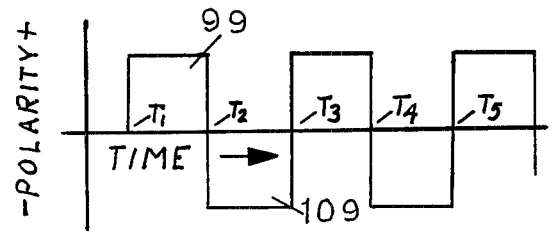

FIGS. 9a and 9b show an arrangement of driving pulses which are preferred. 90 and 100 are the representative half-cycle pulses used to drive single row currents; while 99 and 109 are the corresponding half-cycle pulses of column current at twice the repetition rate as the row currents. Thus, we would usually successively drive single rows while driving double columns. This not only permits us to scan a complete memory in half the time otherwise required but also permits us to pick up the alternate squares that otherwise are missed. During the total time period, $T_1$ to $T_3$, row current is driven from terminals 111, 113, in the form of 90, FIG. 9a, while the corresponding column current is driven from terminals 101 and 104 in the form of 99 and 109, FIG. 9b. During the time period $T_1$ to $T_3$, when both $i_a$ and $j_a$ are positive, we pick up square aa, while during time period $T_2$ to $T_3$, when $i_a$ is positive and $j_a$ is negative, we pick up square ab. If it weren't for the empty alternate squares of the checkerboard pattern we couldn't do this. Accordingly, FIG. 11 represents the situation with respect to a given set of squares during time period $T_2-T_1$, while FIG. 11a represents the situation with respect to identically the same set of squares during the time period $T_3-T_2$.

FIGS. 12 and 12a correspondingly represent similarly disposed patterns of conductors, enclosing the same squares as FIGS. 11 and 11a, and which are employed in the signal readout circuit. While this circuit will have real terminals 121 and 122, with a conductor junction at 123, we illustrate the situation using two sets of squares, one for each time period pattern, with imaginative terminals 124 and 125, and imaginative inter-connections 120, 126, 127, 128 and 129. This permits a ready tracing of all signal paths during both time periods. If the signal conductor pattern is identical with the driving pattern, the alternating checkerboard polarity structure is completely removed.

The bit polarities, as above fixed, and the corresponding signals generated when the stored magnetic energy is released through destructive readout, we might define as "1's" in the binary code. With the reversed direction of row current, $i_a$, during time period $T_3$ to $T_5$, and two-column current, $j_{ab}$, making a full cycle swing, we get "0's" in the same squares where we previously got "1's". Thus, by means of row current of frequency p, and two-column current of frequency 2p, appropriately phased, all operations on the magnetic memory can be carried out.

The remainder of the memory is swept by successively energizing dual columns while maintaining an appropriate drive in single rows. Accordingly, with the drive still applied to row a, columns c and d are next swept, and following these, columns e and f, etc. With all columns covered, row b is next driven with single frequency current and all dual columns again swept with two-frequency current; then rows c, d, e, and f, etc.

When the tangential component of the magnetic field about conductors carrying electric current is used to store memory bits in one embodiment, the conductors of a grid, such as those of FIGS. 11 and 12, would be connected to drive currents in pairs of conductors, as illustrated by FIG. 15. The storage element, or bit, would not then cover the entire square, as it does when the vertical component of the field is used, but would be concentrated along the diagonal 145 which sums the parallel flows in the pairs 141, 142 and 143, 144, and polarized in the direction of arrow 146. In another embodiment, each crossing of conductors, as 152 and 153, FIG. 18, is used to define a bit location. In this case, the bit is formed along the diagonal 154, which sums the current flow at the point of crossing, and is polarized in the direction 155. Typical locations and forms of these storage bits is shown by 147 and 148, FIG. 16. A comparison of FIGS. 16 and 17 reveals the difference in the two methods of storage.

One of the more difficult problems with respect to all magnetic memory devices is the general coupling between drive lines and sense lines which gives an adverse signal-to-noise ratio. This coupling can be so large as to completely mask the relatively weak sense signals. To get around this problem, we propose putting the drive lines on one side of the magnetic storage medium, which we now identify as a magnetic screen, and the sense lines on the other side. The magnetic screen, as long as it isn't saturated, will generally shield the sense lines from the drive lines, and currents in the drive lines which are too small to saturate the magnetic screen will not couple effectively with the sense lines. This arrangement is shown in FIGS. 21 and 21a, where 180 is the ferromagnetic medium in the form of a magnetic screen, 181 and 182 are the typical crossing drive lines, and 183 is a typical sense line.

Suppose that currents in the drive lines are large enough to completely saturate the magnetic screen in the area 184. The action for currents in the same direction as those which produced saturation will then be essentially the same as it would be if the magnetic screen wasn't there. For currents in the drive lines in the opposite direction, however, the action will start as though the magnetic screen was absent but as this opposing drive increases the saturation of the magnetic screen becomes less and less complete until a certain value of opposing drive is reached, whereupon the screen is no longer saturated at all, and the drive lines and sense lines are once again shielded from each other.

If, at this point, the opposing drive is removed, the saturation of the screen will follow the hystersis loop of the screen material and fly back to its condition at the point of retentivity. If, however, the opposing drive is increased to the point where the screen is saturated in the opposite direction, and the opposing drive then removed, the screen will not fly back to its original state but will stay in its second state of saturation. Obviously, if we can localize this type of action to sequences of relatively small areas in a large sheet, we have a binary storage facility available to us. This we can do by again making use of the tangential components of magnetic flux issuing from a set of crossing conductors.

To localize the above described action; i.e., reduce it to a system of many small areas, we use a grid of drive lines and put currents in each of them of such magnitudes that at selected crossing points of the grid the total magnetic field of the cureents is large enough to saturate the magnetic screen in the vicinity of the crossings, but not large enough elsewhere to saturate the screen. For example, if the grid is orthogonal and it takes unit current, I, in a single conductor to saturate the screen, then we put 0.7 I in each conductor, selectively, so that where the conductors cross the current will effectively be, I, along a line making 45° to the drive-line grid, and the magnetic screen will be saturated at this point. This arrangement is illustrated in FIG. 22 where, as before, 181 and 182 are the crossing drive lines, 183 is the typical sense line, and 180 is the magnetic screen.

Figure 23:
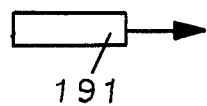
FIG. 23 is a diagramatic representation of an information bit in the form of a magnetically oriented window in the magnetic screen of FIGS. 21 and 22.

As long as the screen is not saturated, most of the flux from the drive lines flows into, through, and out of the magnetic screen as shown by the flux lines 199, but once the screen is saturated, it becomes incapable of carrying all of the flux of the drive lines and so this flux, 186, spills over, penetrates the sreen and couples the drive and sense lines, again as shown. It is as if a small magnetically oriented window has been opened in the screen at the point of drive line crossing, as denoted by the unshaded area 190, and as further depicted by 191 and 192 of FIGS. 23 and 24, respectively.

Figure 26:
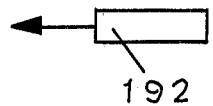
FIG. 26 is a diagramatic representation of the information bit that is the companion bit of FIG. 23. It is also in the form of a magnetically oriented window in the magnetic screen of FIGS. 21 and 22. If
Figure 24:
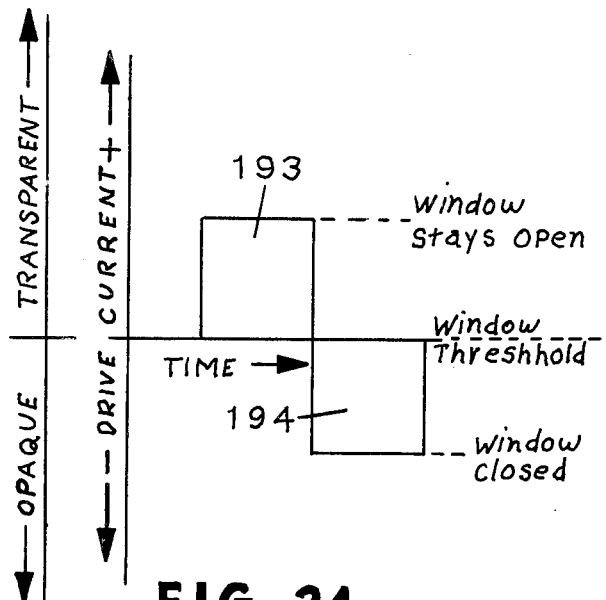
FIG. 24 is a graph of the current pulse used to produce and/or read the bit of FIG. 23.
Figure 27:
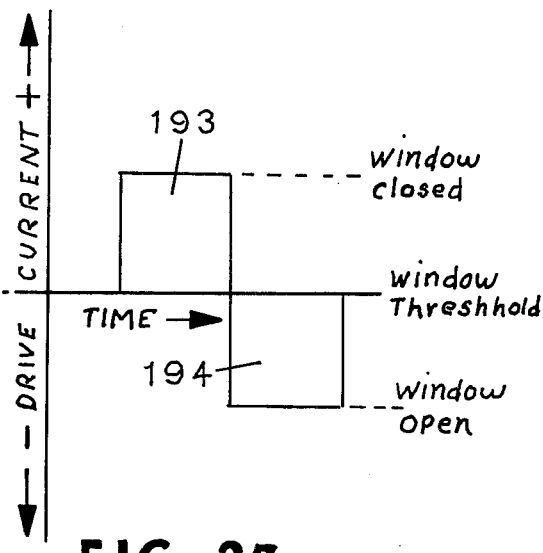
FIG. 27 is a graph of the current form used to produce and/or read the bit of FIG. 26.
Figure 25:
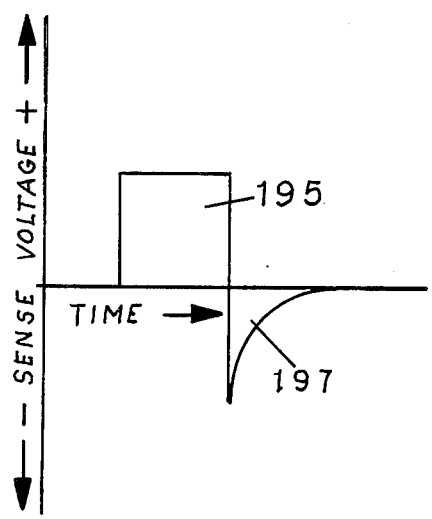
FIG. 25 is a graph of the pulse form of the sense voltage produced when the bit of FIG. 23 is non-destructively read.
Figure 28:
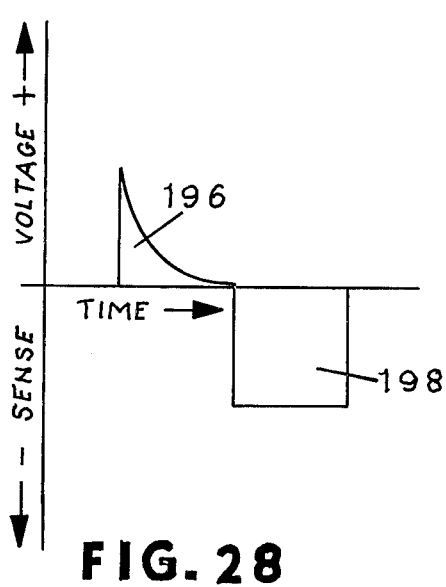
FIG. 28 is a graph of the pulse form of the sense voltage produced when the bit of FIG. 26 is non-destructively read.

If the rectangular pulse of current shown in FIG. 24 is applied to the drive lines at a window, the corresponding pattern of voltage induced in the sense lines is as shown in FIG. 25. On the other hand, if the oriented window, due to saturating drive currents of opposite direction, is as illustrated by FIG. 26, the induced voltage in the sense line will be as shown in FIG. 28.

By making appropriate use of the window orientations, and the voltages derived therefrom, we have the required binary signal states "1" and "0". Thus, instead of storing small packets of magnetic energy to define the binary states, we store magnetically-oriented windows in the magnetic screen, so that drive currents of corresponding polarity strongly couple the sense lines at the window openings, while drive currents of opposite polarity do not strongly couple the sense lines (They kick the door shut in front of themselves so to speak.) unless these currents are strong enough to flip the orientation of the window.

In the normal situation of operating a complete memory sheet, by means of crossing drive lines, we have a number of windows open to each drive line as shown in FIG. 29, with only one window, 213, common to both drive lines. Obviously, each of these windows will respond to the drive lines crossing them and to a limited extent will induce sense voltages. These sense voltages in response to square wave driving currents will be of the form of FIG. 30, where the response to the open window, 200, will always be greater than the response to the closing window, 201. These are all unwanted sense signals, or noise, but in each sensing array, illustrated by FIG. 29, there will be one, and only one, joint driving current sufficient to at least completely close the window on one side, and as stated this is available to only one window at a time as determined by where the drive lines cross. From these, we get the distinguishing patterns of FIGS. 25 or 28. When the joint driving currents are of sufficient magnitude to flip the windows, we get the sense patterns of FIGS. 31 or 32.

The distinguishing characteristics of the signals in all cass are the transient pulses of short duration on the closing window sides, pulses 203 and 207, and the destructive readout signals, 204 and 208, of larger amplitude than all the others. 202 and 206 are the respective non-destructive read-out signals on the open window sides, while 205 and 209 are the window closing pulses following destructive read-out.

With appropriate time-separating and/or amplitude separating means provided in the electronics, the distinguishing signals can be separated from the others and from the background, the state of the window determined, and gates or other circuitry operated accordingly.

One such simple but very effective device is the coherent detector, or ring demodulator, wherein a system of diodes is operated by the drive line voltage to synchronously examine the sense line voltage. Such a device can be designed to produce slowly varying rectified voltages from the time average of the background and more-or-less isolate the sharp transient pulses that are produced by the closing of a window. A system of time-operated gates will serve the same purpose.

The big advantage which the foregoing binary storage means can provide, in addition to all the other advantages of sheet memory devices as heretofore enumerated is that it is able to produce relatively large sense signals since at an open window the drive lines are more-or-less directly coupled through the respective windows to the sense lines at the cross-overs.

Sense line geometry can be a duplication of drive line geometry, or it appears that a system of non-crossing parallel sense lines might suffice. In this instance the preferred orientaion of the sense lines, 225, would be 90° to the window orientations, 224, as shown in FIG. 33, where 221 and 222 are the drive line orientations. This arrangement and orientation of the sense lines, relative to the drive lines, has the distinct advantage of providing a 2:1 ratio of currents in the saturated and unsaturated states, with a corresponding advantage in sense voltage induction.

Again, while the drive lines have been shown as orthogonal, this is not a necessary requirement: it is only sufficient. The drive lines can be at any angle with respect to each other which will provide a practical system of crossings. The more nearly parallel they become, the greater is the sum of their currents at the crossing, but if the lines become completely parallel there are obviously no crossings; moreover, the more nearly parallel the drive lines become, the greater is the spread of the crossings, so that it is highly probable that orthogonal crossings make the best use of currents and memory material.

Grain-oriented magnetic screen sheets which also have square hystereses loops would serve the purpose of this invention very well if they can be fabricated sufficiently thin. These sheets would be so placed that the most favorable direction of magnetization is aligned with the direction of the windows. Likewise, sheets deposited on a thin substrate in a magnetic field would appear to serve the same purpose.

Figure 34:
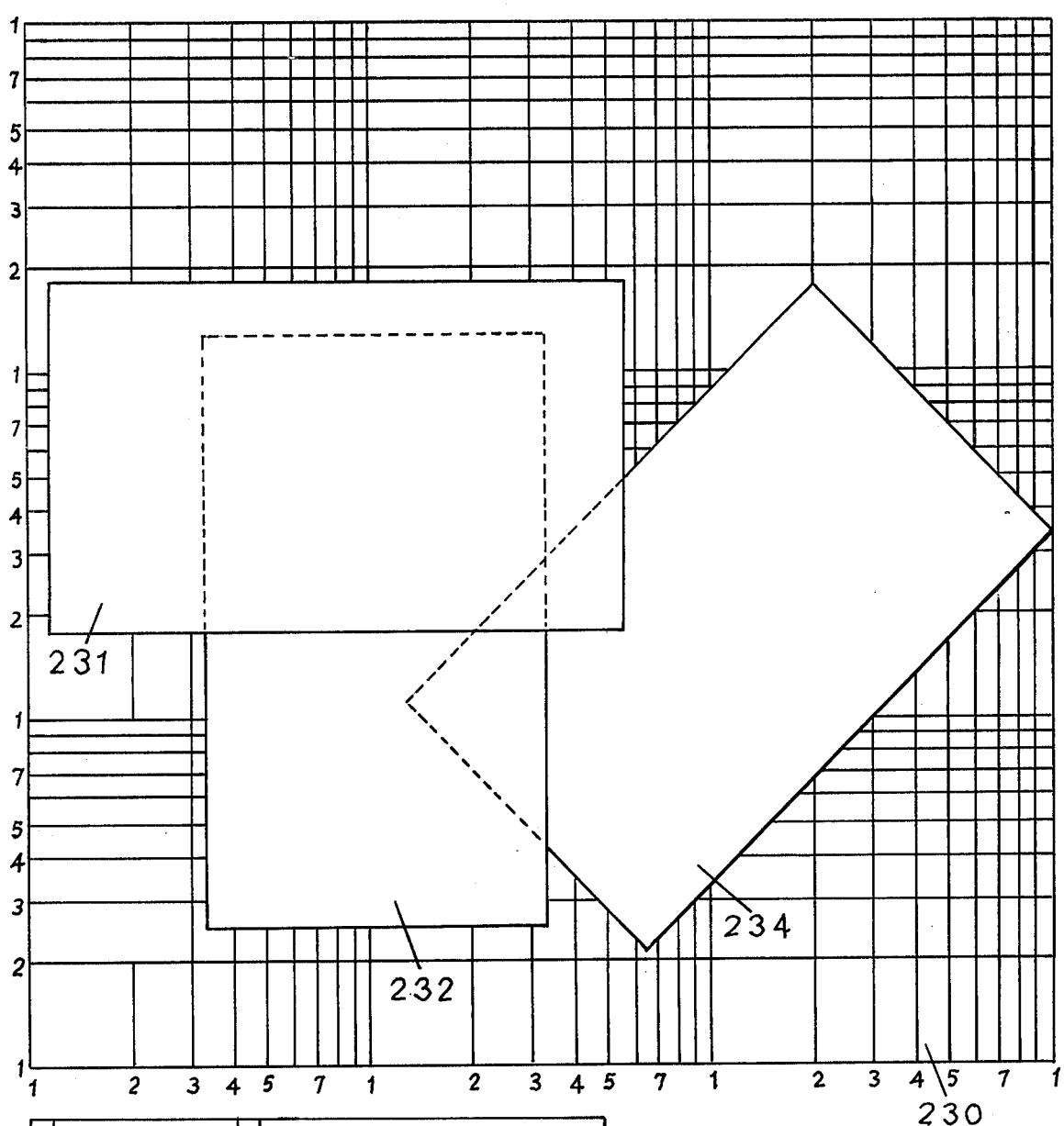
FIG. 34 is a drawing showing a non-linear arrangement of drive lines with respect to memory card positions whereby the provisions of security are further enhanced.

In the foregoing, security in the use of PID cards has been obtained by using the eight possible card positions, in a read-write computer head, and associating these positions with names and/or numbers. It was additionally proposed that buttons in the read-write head could be substituted for the eight card positions to program the computer to provide security in the same way the eight card positions accomplished the task, and that additionally many more programming positions could be provided. We'll now show in more detail than initially provided exactly how this can be accomplished in at least two ways. One such is to provide non-linear configurations of drive lines as shown in FIG. 34 where a log-log configuration is illustrated. If each line of the figure represents the position of a drive line, without any particular significance given to the dimensions, Quite obviously the information will be programmed on the card in accordance with how the card is placed on the grid of drive lines. Three card positions, 231, 232, and 234 are shown for illustrative purposes only. Obviously, many more positions can be provided and catalogued by names and numbers. Again, it is obvious that it matters not whether we move the card around on a fixed set of drive lines, as illustrated, or place the card in a fixed frame and move the grid of drive lines under it, with positions of drive lines again catalogued by names or numbers. Drive lines can, and have been, put on thin flexible plastic sheets and put on rollers, with flexible leads attached, and the grid shifted under a fixed card position by rotating the rollers. Likewise, it is obvious that we can leave both card and grid of drive lines fixed mechanically and move the programming pattern electrically by means of drive line selectively switches operated by push buttons 77 on the read-write head, FIG. 7.

For example, each line position on the grid of FIG. 34 can be represented by a switching wafer on a multilayer switch, and the sequences of actual drive lines of the computer program represented by switch positions on each wafer. Accordingly, any program sequence can be placed at any line position on the grid. Switch button operated selectively switches of this type have been patented and are available on the commercial market. A catalogue of names can of course be associated switch sets, wafers of switch sets, and positions on wafers.

FIG. 34 shows a logarithmic arrangement of drive lines used in conjunction with linear positioning of the card, as already noted. A three-cycle log-log arrangement is provided but obviously any number of cycles can be used. Indeed, the arrangement of drive lines need not be logarithmic. All that is required is some non-linear, incommensurate, or helter-skelter arrangement of lines provided for a fixed card position or a linear arrangement of card positions.

With a fixed card, fixed conductor arrangement provided, and programming provided by means of selector buttons, a screen of closely-spacec conductors would preferably be provided and each conductor of the screen connected to the terminals of a multiplicity of switches. On one switch, a given conductor would be connected to terminal 1; on another switch to terminal 4, on still another, to terminal 7, etc. Thus, if the programmed information is supplied, and accepted, by the computer in terms of switch terminal numbers, the arrangement of this information on the card would be determined by which selector button, or buttons, are pushed when the card is placed in the reader head. Clearly, much of the information could be placed on the card in a regular way without invoking the security feature. A few lines of security oriented information would be sufficient to expose impostors. Too, the eight-position security feature of U.S. Pat. No. 4,055,746 can be used in combination with any of the foregoing additional security arrangements.

Again, either the vertically polarized storage elements provided by the circuitry of FIGS. 11, 11a, 12, 12a, 13 and 17, or the tangential storage elements provided by the circuitry of FIGS. 14, 15, 16 and 18, can be used with any of the foregoing security arrangements.

The security programming arrangements described immediately above introduce us to the second general method of selectively switching the arrangement, or position, of information on the PID, and this system and means is probably preferred over all other becase it best conforms to existing computer programming practices. Under this system, all information is linearly and regularly placed on the card, and security provided by selecting the position on the card where the program starts.

Figure 35:
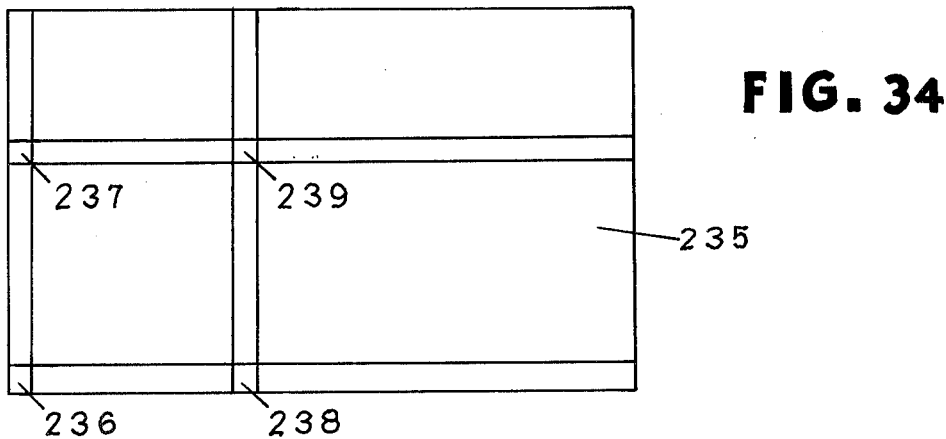
FIG. 35 is a drawing showing how a memory card is addressed to provide security under the control of the card owner.
Figure 36:
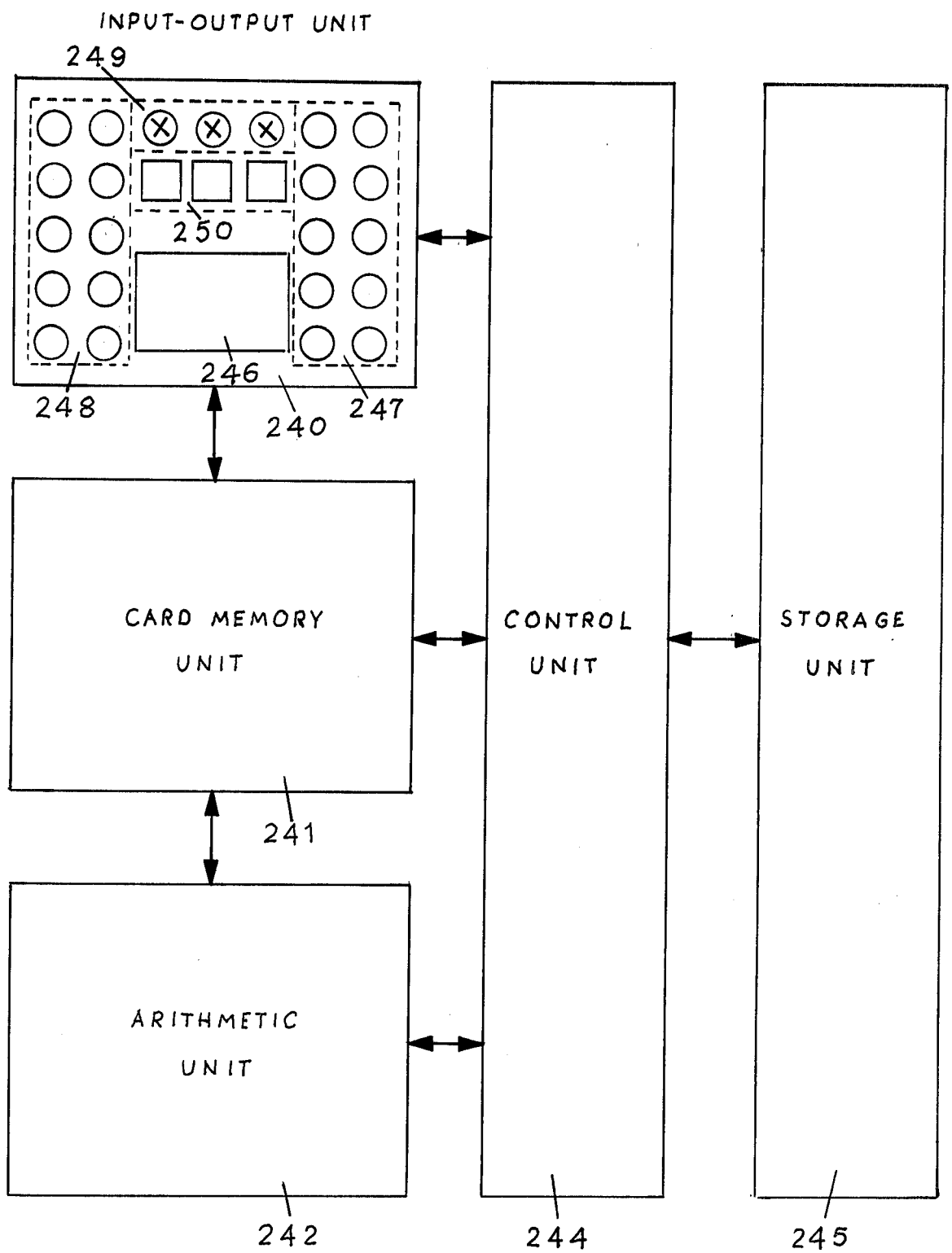
FIG. 36 is a schematic block diagram showing the computer functions essential to this invention.

In computer memories generally, each piece of stored information is given as "Address" where it can be found. Conforming with this practice, we provide an "Address" for the Security Feature, so to speak, by providing means whereby the program on the card can be selected to start at any rectangular location of a bit on the card, and from there we proceed with the program. This system and method of providing security is shown in FIGS. 35 and 36.

While for purposes of this invention it is not necessary to go into the many details of computer design, perhaps a few general principles would be sufficient to further show and clarify all that can readily be provided by computers to effect security control. For this purpose, a computer can be described by the functional block diagram of FIG. 36, comprised of an input-output unit 240, a card memory unit 241, an arithmetic unit 242. A control unit 244, and an overall storage unit 245.

The INPUT-OUTPUT UNIT, 240, is the operational box of the system. It has an indented Card Acceptor Cavity, 246, which exactly fits the Customer Card, or PID, with a tolerance of + a few thousandths of an inch. Immediately under the Card Acceptor Cavity is the grid of drive and sense lines (Not shown) for reading and writing on the card. In addition, it has a number of opertional buttons for performing the functions of identification and business transfer. For example, the set of round buttons to the left, 248, represent those required for business transactions, while the set of round buttons on the right 247, represent those required for name identification and programming. Like the buttons, of the register 77, FIG. 7, the buttons of register 247 would have both names and numbers. The set of square buttons on top, 250, represent those which the customer must operate to control what he has to do, and the set of round circles with crosses above the square buttons, 249, represent lights which show when the control instructions have been properly performed. Of course, there can be more or less buttons and lights than those shown add and the input-output unit 240 can be equipped with numeral counters, such as those of FIG. 7, 83 and 84, when the business carried out involves money transfers. All that we attempt to do here is outline the essential functions to be performed.

The CARD MEMORY UNIT, 241, is any of several types of memories available today in the computer art: magnetic drum, magnetic disc, magnetic tape, magnetic core array, solid state, etc. It has identically the same information storage capacity as the CUSTOMER CARD, and effectively the same number of rows and columns of information storage. The only differnce between the CARD MEMORY UNIT and the CUSTOMER CARD is that the former is permanently ADDRESSED to start the program at the same spot in its memory bank at every operation, whereas the latter has an ADDRESS for starting the computer program that is variable and known only to the owner of the card.

The ARITHMETIC UNIT, 242, is the computer computational unit wherein all of the computation and logic processes are carried out.

The CONTROL UNIT, 244, is the unit which controls all of the operations programmed into the computer by its internal memory, STORAGE UNIT, 245, the memory stored in the CUSTOMER CARD, and the buttons of the INPUT-OUTPUT UNIT, 240. It will have within it a Program Counter or Sequencer by means of which the business of each customer is carried out in an orderly manner in accordance with a predetermined program or sequence.

The STORAGE UNIT, 245, as above noted, is an overall memory which contains all information pertinent to the complete business being carried out. For example, if the business is a bank, the STORAGE UNIT will contain the banking records of all of its customers: balances; deposits, interest earnings, withdrawals, etc. It may, as noted contain the basic program or the system; optionally, this can, however, be left in the CONTROL UNIT. But is matters not which box these items are left in, the functions are the same regardless.

In our application, we'll consider in detail only those functions essential to security; (1) The Card Memory Unit, 241, has the information put into it, and stored on it, in the same sequence at all times, also as already stated, and to get access to this information, we always start at the same ADDRESS; (2) The Customer Card has the information stored on it in the same sequence but we don't always start at the same ADDRESS. To completely understand this, we need to say what we means by ADDRESS in a memory, and SEQUENCE.

By SEQUENCE, we of course mean the order in which we place and retrieve different kinds of information, as Name, Street Number, Street Name, City, State, Account Number, Bank Name and Location, Banking Balance, Amount to be Deposited, Payments to be Made, and to Whom, Cash withdrawal, New Balance, etc. If the bits which determine this information are always placed in a given memory in the same order, one after the other, we can say they are in the same SEQUENCE.

Typical planor memories have been shown in FIGS. 4 through 6. We again show such a memory, 235, in FIG. 35. We'll say that the computer is programmed to scan this memory in sequential rows beginning at the left bottom position, 231, and moving to the right and completing the botton row, then jumping to the left and scanning the next row, and so forth until the complete memory has been scanned. In this system, each word or piece of information stored has a location or ADDRESS where it can invariably be found; for example, the ADDRESS of the location 236 is 0.0—meaning the zero row and zero column. Similarly, the ADDRESS of location 237 is 10.0; that of 238 is 0.9; and that of 239 is 10.9, where, as seen, the first number of the address pair indicates the row where the information can be found, and the second number of the address pair indicates the column. Each word is of course spelled out of a specified number of bits in a digital computer system.

In the preferred security system of this invention, computer ADDRESSES are preferably designated by means of names rather than numbers, with rows identified by given names and columns by sirnames. For example, the address of location 236, FIG. 35, instead of being 0.0., would become Amy Astor, the address of location 237, instead of 10.0 would become Kitty Astor; that of 238 would become Amy Jefferson, while that of 239 would become Kitty Jefferson.

As already stated in the security system of this invention, the CARD MEMORY UNIT would be sequentially scanned, always beginning at the address 0.0, or Amy Astor, and continuing in some particular order that is programmed by the Control unit 244 in cooperation with the Storage Unit 245. Scanning of the CUSTOMER CARD, on the other hand, would begin at the address specified by the CUSTOMER—the name address he used the last time the card was presented, the name that only he knows and remembers. The scanning would then continue sequentially, row by row from that point until the entire card has been scanned. When the beginning address is other than Amy Astor, say Kitty Jefferson, sequential scanning will proceed from Kitty Jefferson to the right until the Kitty row has been fully scanned, move to the left and up a row to the Lisa Astor location, fully scan the Lisa row, and thence to the top of the card, and from the top of the card, following the programmed sequence, to the bottom of the card, and from there up to the beginning address.

As scanning of the Customer Card proceeds, all of the information found there is transferred to the Card Memory Unit 241. Simultaneously, the Control Unit 244, in conjunction with the Storage Unit 245, having been programmed to known the sequence of information on both the Customer Card and account Number, Card Memory Unit, as Name, Geographical Address, Account Number, Bank Balance, etc., will compare the two. If the information found on the card is different than that which is supposed to be there, or in a different order, the Control Unit will terminate the operation, kick the Customer Card out, and if desirable sound an alarm. In any event, the computer would know that it had found either a crook or a customer who had forgotten his name.

A ready and simple way in which this can be accomplished is as follows: Three words would be allowed for a name, SPACE; ten words for a geographical address, SPACE, SPACE; seven words or numbers for a bank balance, SPACE, SPACE, SPACE; eight words or numbers for an AccountNumber, SPACE, SPACE; etc. SPACE would be a word spelled in a way no other word is ever spelled. Thus, the moment scanning produced a SPACE where in the programmed sequence there shouldn't be one, or in the sequence didn't find a SPACE where there should be one, or if sequential scanning started in the middle of a word, or any part of a word other than the beginning, the Control Unit would know it had an imposter or a customer with an exceptionally poor memory.

Security having been satisfied, information from the Cusomter Card having been transferred to the Card Memory Unit, the Control Unit would cause the Arithmetic Unit, 242, to take over and carry out the transactions the Customer had punched ino the Input-Output Unit, and any changes brought about by these transactions would be written into the Card Memory Unit as well as into the primary Storage Unit.

If the Customer chose to keep the same security name he had when he placed his card in 246, he would do nothing additional and the revised information would be returned to his card starting with the same address that was found on the card as presented and which was temporarily stored in the Card Memory Unit. If, on the other hand, the Customer elected to use a different Security Name, he would previously have pressed a specified control button and, following this, the buttons of the new name. Under this circumstance, the information held by the Card Memory Unit, 241, would be returned to the Customer Card beginning at the ADDRESS specified by the NEW NAME. This done, the Customer Card would be released, the Card Memory Unit wiped clean and the computer made ready for the next customer.

What is claimed is:

1. An electronic computer system comprised of more than one substantially identical computers each of which is comprised of at least an Input-Output Unit, a Card Memory Unit, an Arithmetic Unit, a Control Unit, an Information Storage Unit, and a multiplicity of Customer Memory Cards, and wherein:

said Input-Output Unit has a Control Panel which consists of a multiplicity of Keys, lamps, numerical registers, and a rectangular Indentation disposed to accept said Customer Memory Cards, and internally at least grids of drive and sense lines for writing on, and reading from, said card, and adjacent the surface of said Indentation;

said Card Memory Unit has an information storage facility with an identical information storage capacity as said Customer Memory Card, and fixed grids of drive and sense lines for writing on, and reading from said information storage facility;

said Arithmetic Unit is disposed to carry out all the necessary computational and logic functions of said computer;

said Control Unit is disposed to carry out all of the steps which are programmed within it and said Storage Unit, the steps which are programmed into it by the Keys on said Control Unit, and the steps which are programmed into it by the information stored on said Customer Memory Card;

said Information Storage Unit is disposed to contain all the information essential to the complete operation of said computer, and is further disposed to accept and retain information from said Customer Memory Card and from said Keys of said Control Panel;

said Customer Memory Card is comprised of a magnetically thick continuous plane sheet of ferromagnetic material sandwiched between two thin sheets of non-magnetic electrically-insulating material;

said grid of drive lines adjacent the surface of said rectangular Indentation comprised of a multiplicity of electrical conductors paralleling said surface and divided into two sets, with the conductors of each set substantially parallel to each other, with each of the conductors of a first set making an angle with each of the conductors of a second set and thereby forming an array of conductor crossings, with the conductors of each set selectively energized with electric current under the programmed control of said Control Unit and of such magnitude that when current flows in both conductors of an intersecting pair of conductors, at the same instant of time, a magnetic field is established, the tangential component of which is sufficient to magnetically saturate a spot in said ferromagnetic sheet of material of said Customer Memory Card which is placed in said Indentation, said spot being immediately under said conductor crossing and said saturation polarized in a direction parallel to the plane of said sheet and fixed in direction by the direction of current flow in said conductors.

2. An electronic computer system, as in claim 1, wherein said ferromagnetic material is comprised of two contiguous sheets of material in magnetic contact with each other throughout the extent of both sheets, said sheets having substantially different values of coercivity and permeability.

3. An electronic computer system, as in claim 1, wherein said first and second sets of conductors are substantially at right angles to each other.

4. An electronic computer system, as in claim 3, wherein said conductors of both sets are closely spaced and wherein said Keys cooperate with said Control Unit to selectively activate chosen conductors by connecting them to current sources and thereby forming a logarithmic grid of activated conductors the position of which, relative to the position of said Customer Memory Card in said Indentation, is under the control of said Keys.

5. An electronic computer system, as in claim 3, wherein some of said conductors are selected by said Control Unit to read the information on said Customer Memory Card and transfer it, line by line, to said Card Memory Unit.

6. An electronic computer system, as in claim 5, wherein a predetermined sequence of information for said Customer Memory Card, and said Card Memory Unit, is fixed by said internal program, and wherein this predetermined sequence of information is compared with the sequence of information found on this Card, and wherein, if the sequences of information are different, the computer transactions are terminated, the Customer Card is ejected, and an alarm is activated.

7. An electronic computer system, as in claim 3, wherein said conductors of both sets are selected to form a linear array of conductors, wherein the information put on, stored in, and read from, the Customer's Memory Card is addressed to start from a variable position on said Card, under the control of said Keys on said Control Panel, in cooperation with said Control Unit, and thereafter to flow in a continuous pre-determined sequence, row by row, until the entire Memory Card has been scanned, wherein the provisions for a sequence of information on the Card Memory Unit is addressed to start from a fixed position at the beginning of a first row and thereafter to flow in a continuous pre-determined pattern, row by row, until the entire Card Memory Unit has been scanned, and wherein the information found on said Customer Memory Card is transferred to said Card Memory Unit, and compared with the sequential provisions of said Card Memory Unit, and wherein, if the information found on said Customer Memory Card doesn't fit the sequential provisions made for it on said Card Memory Unit, all computer transactions are immediatedly terminated, the Customer Memory Card is ejected from the Input-Output Unit and an alarm activated.

8. An electronic computer system, as in claim 1, wherein said first and second sets of conductors are at right angles to each other and disposed on one side of said Customer Memory Card to form a set of drive lines and provide a multiplicity of intersections, wherein said Indentation is provided with a cover within which another set of conductors is deployed, said cover and said other set of conductors disposed to overlay said Customer Card after it has been placed in said Indentation, said conductors in said cover forming a set of sense lines at least one of which passes through the projection of each intersection of drive lines, wherein said drive lines are sequentially activated with electric current, by said control unit, to magnetically saturate a spot in said sheet of ferromagnetic material directly above an intersection of drive lines to open a magnetically-oriented window onto one of said sense lines, said magnetically-oriented window having directions defined by the two points of magnetic retentivity, one of which is arbitrarily designated a "1" in digital bit terminology, and the other of which is designated a "0", and wherein said sense lines are sequentially connected to a voltage measuring apparatus.

9. An electronic computer system, as in claim 8, wherein said voltage measuring apparatus contains further means of separating selected portions of the voltage pulses produced in said sense lines when they are coupled to said drive lines through an open window.

10. An electronic computer system, as in claim 8, wherein said sense lines make an angle of substantially 45° with said drive lines.

11. An electronic computer system, as in claim 1, wherein the information storage medium of said Card Memory Unit is comprised of a continuous sheet of ferromagnetic material sandwiched between two thin non-magnetic electrically-insulating sheets, wherein said grid of drive lines is formed of a first set of electric conductors substantially at right angles to a second set of electric conductors, forming an array of drive line intersections which are deployed on one side of said sheet of ferromagnetic material, and said grid of sense lines is deployed on the other side of said sheet of ferromagnetic material, wherein said drive lines are sequentially activated with electric current, by said control unit, to magnetically saturate a spot in said sheet of ferromagnetic material directly under each selected intersection of drive lines to open a magnetically-oriented window onto one of said sense lines, said magnetically-oriented window having one of two directions defined by one of two points of magnetic retentivity, one direction of which is arbitrarily designated a "1" in digital bit terminology, and the other of which is designated a "0".

12. An electronic computer system, as in claim 1, wherein the storage facility of said Information Storage Unit is comprised of a continuous plane sheet of ferromagnetic material sandwiched between two thin sheets of non-magnetic electrically-insulating material, a grid of drive line conductors, having members at right angles to each other and forming an array of intersections, on one side of said ferromagnetic sheet, and an array of sense line conductors on the other side of said ferromagnetic sheet, wherein said drive lines are sequentially activated with electric current by said Control Unit to magnetically saturate selected spots in said ferromagnetic sheet directly under each selected intersection of drive lines to open magnetically-oriented windows onto said sense lines, said magnetically-oriented windows having directions defined by the points of magnetic retentivity, one of which is arbitrarily designated a "1" in digital bit terminology, and the other of which is designated a "0".

13. An electronic computer system, as in claim 1, wherein said rectangular indentation is an orientation device, and wherein said customer memory card is extended in size, and this combination is disposed to provide, accept and utilize magnetic memories of greater content than said customer memory cards, said magnetic memories comprising continuous plane sheets of ferromagnetic material sandwiched between two thin sheets of non-magnetic electrically-insulating material, forming two surfaces, and further comprising:
  a grid of drive lines adjacent one of said surfaces and comprised of a multiplicity of electrical paralleling said surface and divided into two sets, with the conductors of each set substantially parallel to each other, with each of the conductors of a first set making an angle with each of the conductors of a second set and thereby forming an array of conductor crossings;
  a grid of sense lines adjacent the other of said surfaces and comprised of a multiplicity of electrical conductors paralleling said surface, at least one of which effectively passes through a crossing of said array of conductor crossings;
  said grids of drive and sense lines deployed with said sheet of ferromagnetic material between and magnetically shielding them from each other;
  said conductors of each set of drive lines selectively energized with electric current to magnetically saturate a spot in said sheet of ferromagnetic material directly under each selected crossing of drive lines to open magnetically oriented window onto one of said sense lines, said magnetically oriented window having one of two directions defined by one of two points of magnetic retentivity, one direction of which is arbitrarily designated a "1" in digital bit terminology, and the other of which is designated a "0".

14. An electron computer system with a magnetic memory device, as in claim 13, having said sets of drive lines orthogonally disposed with respect to each other.

15. An electronic computer system with a magnetic memory device, as in claim 14, with the conductors of said grid of sense lines parallel to each other and making angles of 45° to said sets of drive lines.

16. An electronic computer system with a magnetic memory device, as in claim 13, having said grid of sense lines divided into two sets, with the lines of each set parallel to each other, and the sets angularly displaced with respect to each other.

17. An electronic computer system with a magnetic memory device, as in claim 16, with the two sets of sense lines orthogonal to each other.

18. An electronic computer system with a magnetic memory device, as in claim 13, wherein said ferromagnetic material is comprised of two contiguous sheets of material in magnetic contact with each other throughout the extent of both sheets, said sheets having substantially different values of magnetic coercivity and permeability.

* * * * *